(12) United States Patent
Boser et al.

(10) Patent No.: US 9,869,553 B2
(45) Date of Patent: Jan. 16, 2018

(54) FREQUENCY READOUT GYROSCOPE

(71) Applicant: THE REGENTS OF THE UNIVERSITY OF CALIFORNIA, Oakland, CA (US)

(72) Inventors: Bernhard E. Boser, Berkeley, CA (US); Mitchell H. Kline, Oakland, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 232 days.

(21) Appl. No.: 14/736,248

(22) Filed: Jun. 10, 2015

(65) Prior Publication Data

US 2016/0003618 A1  Jan. 7, 2016

Related U.S. Application Data

(63) Continuation of application No. PCT/US2013/074835, filed on Dec. 12, 2013.
(Continued)

(51) Int. Cl.
*G01C 19/5776* (2012.01)
*G01D 5/243* (2006.01)
*G01C 19/5755* (2012.01)

(52) U.S. Cl.
CPC ..... *G01C 19/5776* (2013.01); *G01C 19/5755* (2013.01); *G01D 5/243* (2013.01)

(58) Field of Classification Search
CPC .................................................. G01C 19/5776
See application file for complete search history.

(56) References Cited

U.S. PATENT DOCUMENTS

| 5,600,064 A | 2/1997 | Ward |
| 2003/0039325 A1 | 2/2003 | Watanabe |

(Continued)

FOREIGN PATENT DOCUMENTS

| CN | 1204120 A | 1/1999 |
| CN | 1774613 A | 5/2006 |
| CN | 101027536 B | 3/2013 |

OTHER PUBLICATIONS

Korea Intellectual Property Office (KIPO), international search report and written opinion, PCT/US2013/074835, dated Apr. 21, 2014, pp. 1-20, with claims searched, pp. 21-30, counterpart to this U.S. Appl. No. 14/736,248.

(Continued)

*Primary Examiner* — Clayton E Laballe
*Assistant Examiner* — Dennis Hancock
(74) *Attorney, Agent, or Firm* — O'Banion & Ritchey LLP; John P. O'Banion

(57) ABSTRACT

A frequency readout gyroscope is provided, having 2 or 3 axes, in which the frequency of the carrier associated with the oscillation of the proof mass changes while the amplitude stays constant. The invention departs from conventional gyroscopes which rely on measuring transducer sense axis displacement (amplitude modulation) to determine angular input rate. The invention utilizes what could be termed a form of frequency modulation, such as evaluating frequency phase difference between the axes of modulation. Examples include gyroscopes having either a quadrature or Lissajous FM mode of operation, in which angle random walk contribution from the electronics is reduced by approximately two orders of magnitude.

66 Claims, 20 Drawing Sheets

Related U.S. Application Data

(60) Provisional application No. 61/736,040, filed on Dec. 12, 2012, provisional application No. 61/767,643, filed on Feb. 21, 2013.

(56) References Cited

U.S. PATENT DOCUMENTS

| | | |
|---|---|---|
| 2006/0117849 A1 | 6/2006 | Gallon et al. |
| 2006/0260382 A1* | 11/2006 | Fell .................... G01C 19/5677 73/1.38 |
| 2009/0064781 A1 | 3/2009 | Ayazi et al. |
| 2009/0314084 A1 | 12/2009 | Sugibayashi et al. |
| 2010/0257933 A1 | 10/2010 | Verjus et al. |
| 2012/0111120 A1 | 5/2012 | Brand et al. |
| 2016/0109258 A1* | 4/2016 | Boser ................. G01C 19/5726 73/504.12 |

OTHER PUBLICATIONS

European Patent Office (EPO), Supplementary European Search Report dated Oct. 14, 2016, related EP Application No. EP 13 86 3507, pp. 1-8, with claims searched, pp. 9-12.

State Intellectual Property Office of the P.R.C. (SIPO), official action dated Dec. 22, 2016, related Chinese Patent Application No. 201380070131.0, pp. 1-13, machine translation, pp. 14-30, claims examined, pp. 15-42.

State Intellectual Property Office of the P.R.C. (SIPO), official action dated Jul. 21, 2017, related Chinese Patent Application No. 201380070131.0, pp. 1-5, machine translation, pp. 6-9, claims examined, pp. 10-21.

\* cited by examiner

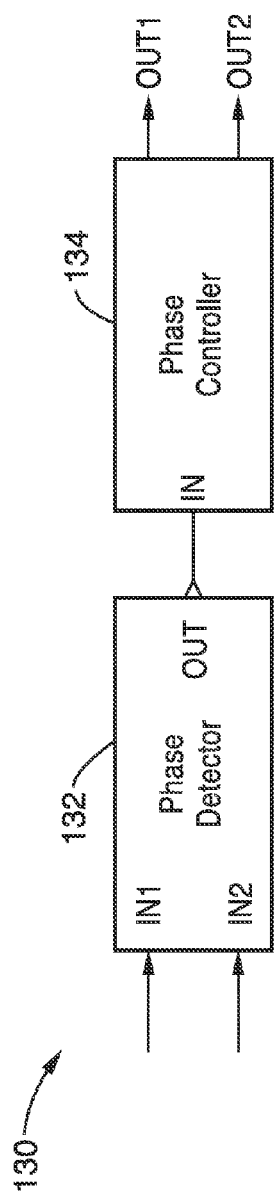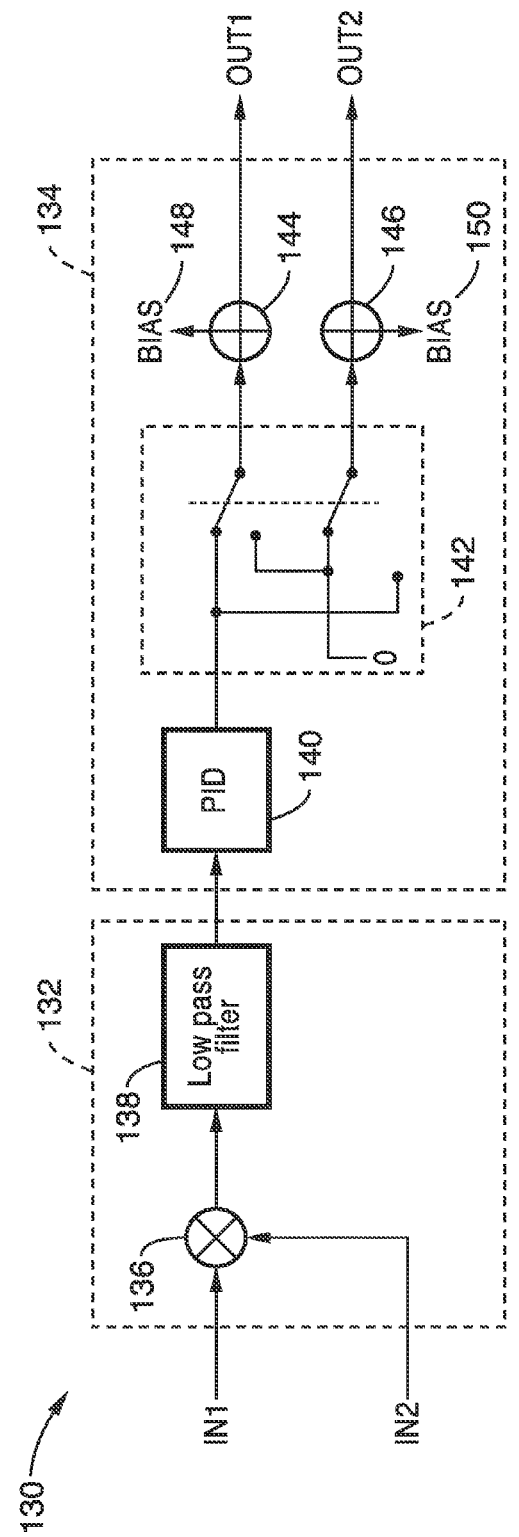

170

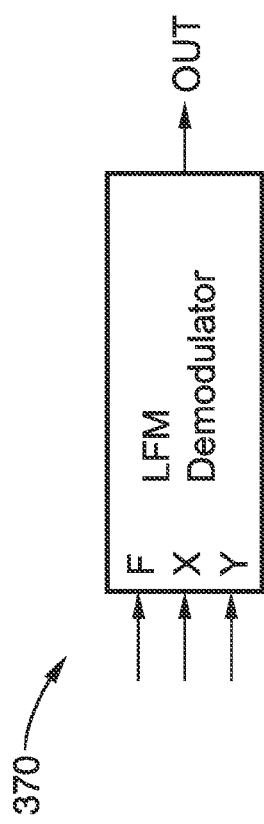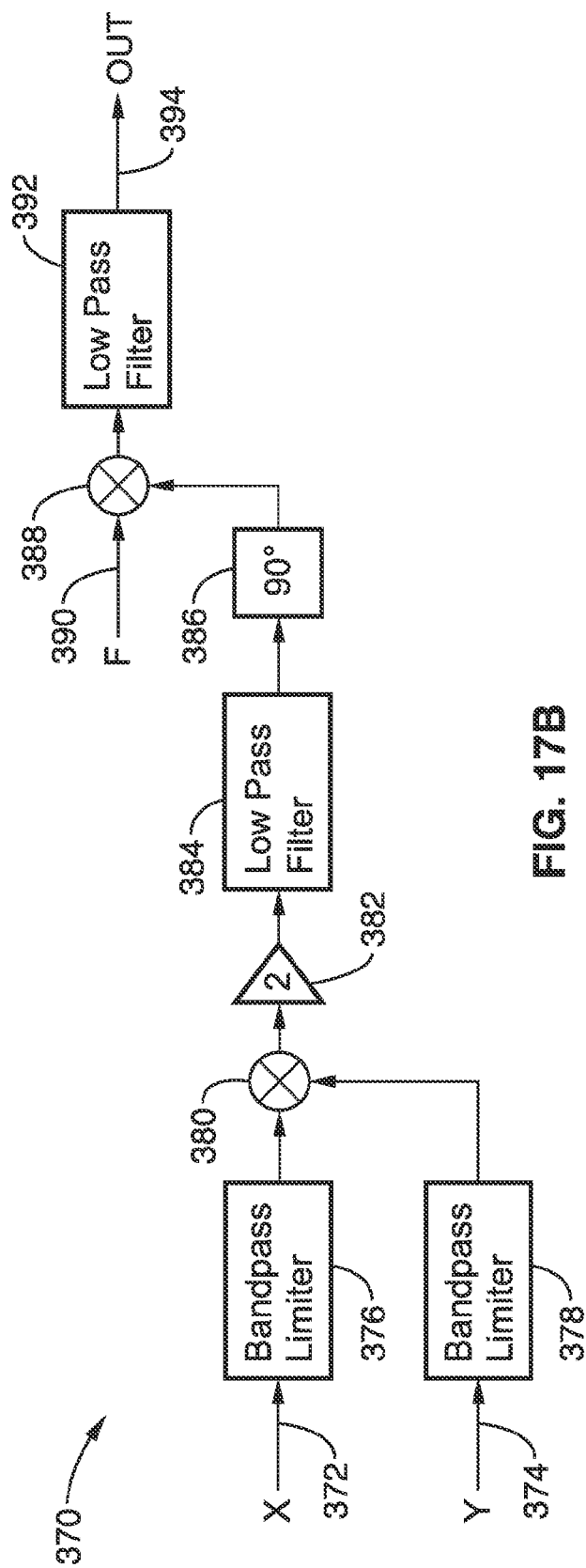

FREQUENCY READOUT GYROSCOPE

CROSS-REFERENCE TO RELATED APPLICATIONS

This application is a 35 U.S.C. § 111(a) continuation of PCT international application number PCT/US2013/074835 filed on Dec. 12, 2013, incorporated herein by reference in its entirety, which claims priority to, and the benefit of, U.S. provisional patent application Ser. No. 61/736,040 filed Dec. 12, 2012, incorporated herein by reference in its entirety, and which also claims priority to, and the benefit of, U.S. provisional patent application Ser. No. 61/767,643 filed on Feb. 21, 2013, incorporated herein by reference in its entirety. Priority is claimed to each of the foregoing applications.

STATEMENT REGARDING FEDERALLY SPONSORED RESEARCH OR DEVELOPMENT

This invention was made with Government support under W31P4Q-12-1-0001 and under W31P4Q-11-1-0003 awarded by the Defense Advanced Research Projects Agency (DARPA). The Government has certain rights in the invention.

The above-referenced PCT international application was published as PCT International Publication No. WO 2014/093727 on Jun. 19, 2014, which publication is incorporated herein by reference in its entirety.

INCORPORATION-BY-REFERENCE OF MATERIAL SUBMITTED IN A COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to vibratory gyroscopes, and more particularly to low-power and low-drift MEMS gyroscopes.

2. Description of Related Art

An inertial navigation system (INS) allows determining (i.e., by 'dead reckoning') the velocity, position, and orientation of a moving object, without the need for external references. The term 'dead reckoning' (DR), also referred to as 'ded' for deduced reckoning is the process of calculating a current position based on a previously determined position, or fix, and advancing that position based upon estimates of speed and direction. Inertial navigation systems rely on a computer which processes inputs from motion sensors (accelerometers) and rotation sensors (gyroscopes) to continuously update position, orientation, and velocity for the moving object.

MEMS technology enables relatively small and inexpensive inertial sensors that are widely used in applications including, for example, crash detection and dynamic vehicle control, motion sensing in consumer gaming devices, and camera image stabilization. However, the performance limitations of currently available devices generally preclude their widespread adoption in a number of attractive fields such as GPS aided or dead reckoning navigation. High power dissipation of present MEMS gyroscopes limit use in battery powered devices, such as smart phones, while performance issues, such as high drift, limit use for navigation.

Present state-of-the-art MEMS gyroscopes operate based on exciting high amplitude vibrations in one or more directions of a proof mass generally referred to as the drive axe(s). Angular rate is inferred from motion of the proof mass in one or more orthogonal directions, which are usually referred to as sense axe(s). Because the amplitude of the motion in the sense direction(s) is orders-of-magnitude smaller than the motion in the driven direction(s), this has necessitated using power hungry low noise amplification in the sense readout circuitry.

Accordingly, a need exists for a low power and low drift MEMS gyroscope, which overcomes the shortcomings of previous gyroscope approaches.

BRIEF SUMMARY OF THE INVENTION

A method and system is described for detecting rotation rate to enable frequency readout gyroscopes. A proof mass is suspended by springs and is free to move along two orthogonal axes or a ring, hemisphere, or similar continuous structure which is free to vibrate in at least two orthogonal or independent modes or axes. Vibration of the mass can occur on both axes simultaneously, with frequencies determined by the natural frequencies of each axis, while the velocity amplitudes of each vibration are preferably constant and equal. This natural frequency of an axis is set by the mechanical stiffness of the axis and mass that participates on the axis as well as the influence of artificial stiffness that can be contributed by tuning inputs. Angular rate is then inferred through a measurement of one or both of the axis oscillation frequencies.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIGS. 10A and 10B are phase detector-controller symbols and schematics utilized according to at least one embodiment of the present invention.

FIG. 17A and FIG. 17B are an LFM demodulator symbol and block diagram utilized according to at least one embodiment of the present invention.

DETAILED DESCRIPTION OF THE INVENTION

1. Introduction.

Figure 1:
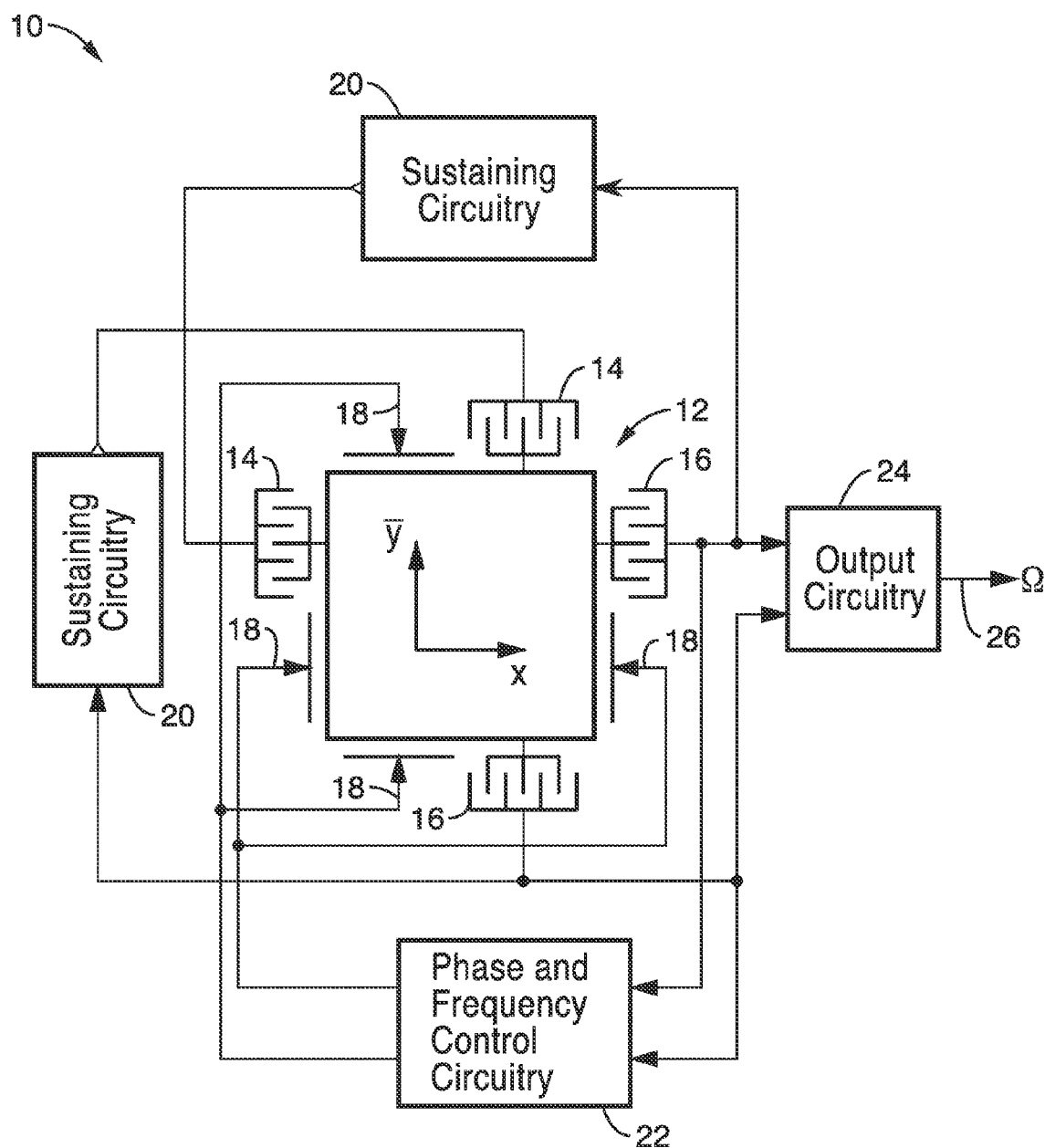
FIG. 1 is a schematic of a direct frequency readout gyroscope according to an embodiment of the present invention.

FIG. 1 illustrates an example embodiment 10 of a direct frequency readout gyroscope. The gyroscope system 10 is shown with a mechanical resonator element 12 having sensing and actuating means 14 and 16. A tuning means 18 is shown for adjustment of the natural frequencies of the resonator. Sustaining circuitry 20 is shown to mechanically excite the resonator at or near its natural frequencies and overcome resonator damping. Phase and frequency control circuitry 22 is shown for controlling the natural frequencies of each mode. Output circuitry 24 converts raw data from the gyroscope to a rate signal 26 to be utilized by the user application circuit. There are several distinct methods of operation enabled by the invention, including but not limited to Quadrature Frequency Modulated (QFM) gyroscope, the Dual Quadrature Frequency Modulated (DQFM) gyroscope, and the Lissajous Frequency Modulated (LFM) gyroscope.

Figure 2:
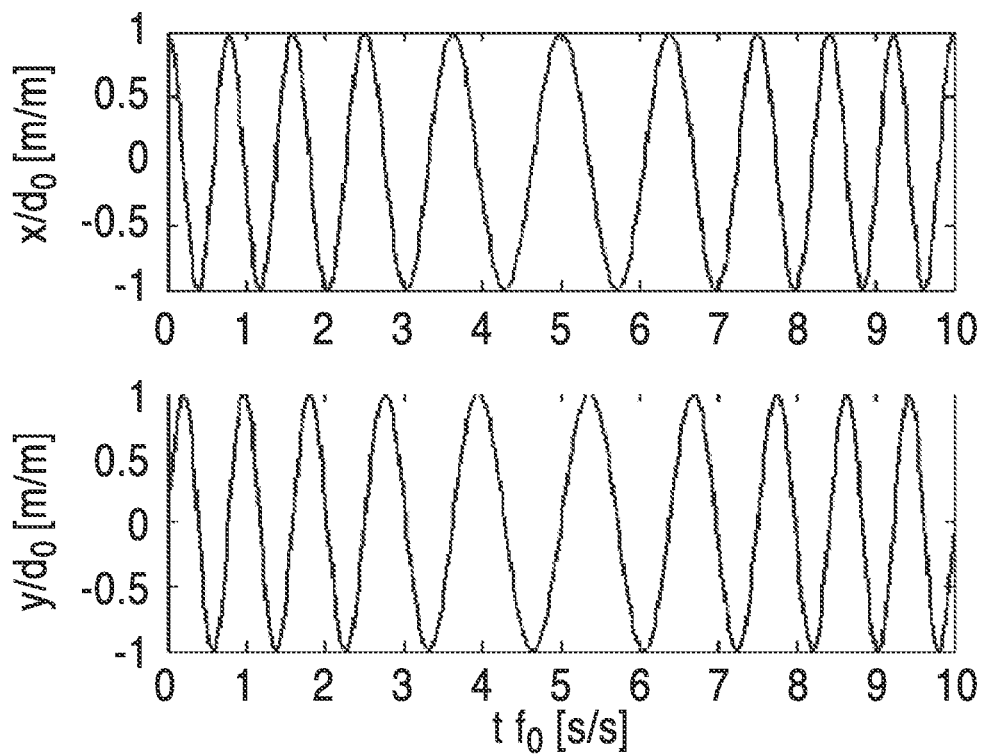
FIG. 2 is a graph of x and y displacements of a proof mass of a gyroscope operating in QFM mode according to an embodiment of the present invention.

FIG. 2 illustrates the displacement vibration signals of the present invention, in which the frequency of the vibrations changes in response to angular rate input signals while the amplitudes stay constant. This is in contrast to prior art solutions where the amplitude of the vibration changes in response to angular rate inputs.

1.1 Resonator with Sensing, Actuating, and Tuning Means.

The present invention utilizes a mechanical resonator (resonator 12 in FIG. 1) with at least two modes of vibration coupled by the Coriolis Effect. The resonator 12 is shown to have two modes of vibration along the x- and y-directions. A mode of vibration is defined as any number of independent mechanical deformations of the resonator, where the total deformation can be described as the sum of the deformations of the individual modes. A deformation should be understood as a continuous vector field which describes the mechanical displacement of each point of the resonator as a function of its position in three-dimensional space. Deformations are, in general, considered to be time varying. A resonator actuated upon by a forced deformation in a particular vibration mode will store a corresponding amount of strain energy. When released, the resonator will attempt to dissipate this strain energy. For a lossless resonator, the result of this action is a sinusoidal vibration of the resonator in that particular vibration mode. The inverse of the time it takes to complete one cycle of vibration is called the natural frequency of the vibration mode. The amplitude, or envelope, of the displacement vibration is defined as half the peak-to-peak displacement at an antinode of the deformation. An antinode is a position of maximum deformation of the particular vibration mode. The amplitude of the velocity of the vibration is equal to the oscillation frequency multiplied by the amplitude of the displacement vibration.

In order for the resonator to be sensitive to rate, the modes must be coupled by the Coriolis Effect. The Coriolis Effect is an effect observed in the rotating frame, whereby energy from one mode of the resonator is coupled into another mode of the resonator, such as from the x-axis to the y-axis, or between orthogonal modes, including from a first mode of vibration to a second mode of vibration. Modes that are coupled by the Coriolis Effect will occasionally be referred to as axes and given names which correspond to their direction of vibration in the rotating frame, such as the x-axis. The rotating frame is a frame of reference perceived by an observer of the resonator which is also rotating at the same rate as the resonator. Common mechanical resonators include pendulums, lumped mass-spring systems, rings, disks, and hemispheres.

Methods of operation will occasionally be described by the trajectory that a proof mass follows when using the particular mode of operation. These descriptions can only be literally interpreted for pendulum or lumped mass-spring systems, but an extension to rings, disks, and hemispheres can be understood in terms of combinations of independent vibrations of the modes. For example, a pendulum swinging at a 45 degree angle corresponds to equal amplitude, in-phase vibrations on both orthogonal modes. A circular pattern corresponds to equal amplitude oscillations of both orthogonal modes with a constant 90 degree phase difference.

The resonator must have means for transduction of mechanical deformations into electrical signals (sensing) and transduction of electrical signals to mechanical deformations (actuating) for each mode of vibration. This is typically accomplished electrostatically through addition of electrodes forming either parallel plate or comb-type capacitors to the resonator. Other means of transduction include piezoelectric, magnetic, or optical coupling.

In at least one preferred embodiment, the resonator is symmetric with respect to the Coriolis coupled vibration modes. Accordingly, each Coriolis coupled vibration mode is preferably configured with identical sensing and actuating means, and the natural frequencies of the vibration modes are closely matching. It is preferable that the natural frequencies match within 10% of the nominal value of the natural frequency, and matching within 1% or less is more preferable. For example, the mechanical resonator would preferably have an x-axis natural frequency and a y-axis natural frequency which match to within 10% (or more preferably 1%), with the sensing and actuating means for each axis being identical.

Figure 3:
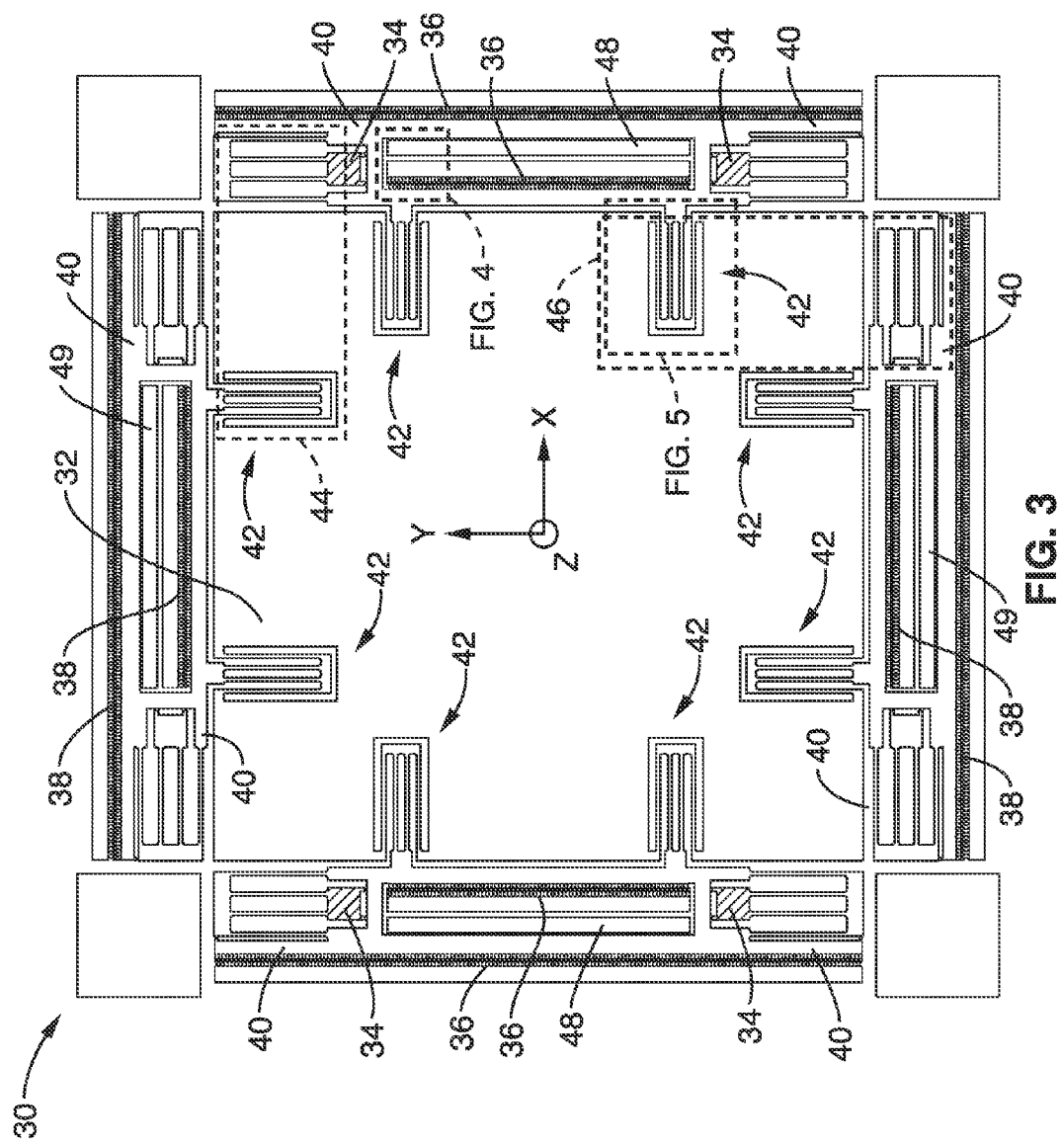
FIG. 3 is a layout of a transducer having QFM and LFM operating modes according to an embodiment of the present invention.

FIG. 3 illustrates an example embodiment of a lumped mass-spring resonator 30 having two primary modes of vibration. The structure 30 having central proof mass 32 is anchored at regions 34 (e.g., to the underlying substrate). The central proof mass 32 is thus configured for vibration along the x- and y-directions. The motion of the proof mass can be actuated as well as sensed utilizing x axis comb drives 36, and y axis comb drives 38. The comb drives are designed to be responsive to only one direction of proof mass motion by residing in their own frames 40 which are isolated from the orthogonal direction by decoupling springs 42. Springs are shown for the x axis 44 and y axis 46. A set of x axis 48 and y axis 49 parallel plate tuning electrodes allows for electrostatic modification of the gyroscope mechanical frequencies.

Figure 4:
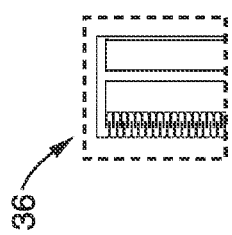
FIG. 4 is a layout of a comb drive and parallel plate tuning structure within the transducer of FIG. 3 utilized according to an embodiment of the present invention.

FIG. 4 depicts a magnified view of a portion of the comb drives 36 of FIG. 3.

Figure 5:
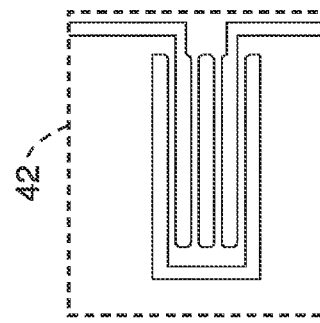
FIG. 5 is a layout of a folded spring structure within the transducer of FIG. 3 utilized according to an embodiment of the present invention.

FIG. 5 depicts a magnified view of a portion of the decoupling springs 42 of FIG. 3.

In regard to the resonator of FIG. 3, proof mass 32 is considered as a mass m, which together with x-axis spring combination 44, and y axis spring combination 46 having stiffness $k_x$ and $k_y$ define mechanical frequencies for each axis as $\omega_{mx}=\sqrt{k_x/m}$ and $\omega_{my}=\sqrt{k_y/m}$. For the sake of simplicity of illustration, FIG. 2 only references one set of these spring combinations 44, 46, although numerous other sets in the x- and y-axis are seen in the figure.

A set of x-axis 48 and y-axis 49 parallel plate tuning electrodes are configured for allowing electrostatic modification of the gyroscope mechanical frequencies. The natural frequencies of the gyroscope in the preferred embodiment are then influenced by the mechanical mass, spring and the electrical tuning signal. The natural frequencies are denoted by $\omega_{ox}$ and $\omega_{oy}$. The natural frequencies are defined as the resonant frequencies of each mode of vibration in the absence of angular rate and damping. If the natural frequencies of the modes of vibration are equal, the resonator is said to be mode-matched.

Extending the above into a third axis, a three degree of freedom proof mass is free to move in the z-direction in addition to the x- and y-directions which can be seen in FIG. 3. The spring in the z-direction defines a z-axis mechanical frequency $\omega_{mz}$ and an additional pair of comb or parallel plate electrodes allow for control and sensing of the z-axis displacement. Similarly, at least one embodiment would include z-axis tuning electrodes to enable control of the z-axis natural frequency. The z-axis natural frequency, determined by mechanical mass and spring as well as an electronic tuning signal, is denoted $\omega_{oz}$. Extending transducer 10 to a third axis preferably includes purposeful reduction of the z-axis stiffness by, for example, reducing the thickness of the proof mass. In at least one embodiment, these z-axis elements would be integrated on another layer, aside from that seen in FIG. 3, such as including parallel plate electrodes between the proof mass and a corresponding plate above or below the proof mass. These electrodes would function as drive, sense, and tuning electrodes.

It should be appreciated that each transducer axis also experiences undesired mechanical damping due to the combined effects of air resistance, anchor loss, and thermoelastic properties of the material. In two degree of freedom resonator, the damping on the x- and y-axes is modeled by $c_x$ and $c_y$. The damper in combination with the mass determine the mechanical ring down time constant of each axis as $\tau_x=2m/c_x$ and $\tau_y=2m/c_y$, respectively. This ring down time can be equivalently modeled as the resonator bandwidth in the frequency domain with $\beta_x=1/\tau_x$ and $\beta_y=1/\tau_y$. In the three degree of freedom transducer, there is an additional z-axis damper $c_z$ which defines a transducer resonance bandwidth $\beta_z=c_z(2m)^{-1}$.

Further mechanical elements that are considered are parasitic springs and dampers that couple motion in one direction to motion in an orthogonal direction. For example, in the two degree of freedom transducer, there is undesired coupling from x- to y-axis motion. Part of this motion is attributed to a spring $k_{xy}$ and part by a damper $c_{xy}$. The spring causes a force $k_{xy}x$ and the damper a force $c_{xy}\dot{x}$ (where $\dot{x}$ denotes the derivative of x with respect to time) to act on the proof mass in the y-direction when displaced in the x-direction. The same statement applies with the roles of x and y reversed. The spring is equivalently represented by a frequency $\omega_{xy}=\sqrt{k_{xy}/m}$ and the damper by a bandwidth $\beta_{xy}=c_{xy}(2m)^{-1}$. Similarly, in the 3 degree of freedom resonator, there are couplings represented by $\beta_{yz}$, $\beta_{xz}$, $\omega_{yz}$, and $\omega_{xz}$.

Control and readout algorithms are occasionally defined as they apply to an ideal transducer element. An ideal resonator has matched mechanical resonant frequencies $\omega_{ox}=\omega_{oy}=\omega_{oz}$, zero resonator bandwidth $\beta_x=\beta_y=\beta_z=0$, and zero spring $\omega_{xy}=\omega_{yz}=\omega_{xz}=0$ and damper cross coupling $\beta_{xy}=\beta_{yz}=\beta_{xz}=0$.

1.2 Sustaining Circuitry.

The sustaining circuitry is connected to the resonator through sensing and actuating means. In at least one preferred embodiment of the present invention, the sustaining circuitry maintains substantially constant (continuous) and substantially equal velocity amplitude oscillations on each axis. Preferably, the amplitude (or envelope) of the velocity signal is exactly constant (which differs from axis-switching implementations), but imperfections in the resonator will cause unwanted ripple in the velocity amplitude. The amplitude is non-zero which differs from certain conventional gyroscope implementations. It should be appreciated that the modes don't have to be equal in velocity for the system to operate, although this provides additional benefits. The term 'substantially constant' should be interpreted herein as including this unwanted ripple. Preferably, the ripple will be less than 10% of the nominal velocity amplitude, more preferably, the ripple will be less than 1%. Similarly, imperfections in the resonator and sustaining circuitry will cause unwanted mismatch of the velocity amplitudes. The term substantially equal should be interpreted as including the unwanted mismatch. Preferably, this mismatch should be less than 10%, and more preferably less than 1%.

The frequency of oscillation observed and sustained by the sustaining circuitry depends on the input rotation rate, natural frequencies, and unwanted parasitic couplings. The dependence on input rate is introduced because the sensing and actuating means lie in the rotating frame. The frequency observed by the sustaining circuitry will be referred to as the oscillation frequency, which is different than the natural frequency.

In at least one embodiment, the sustaining circuitry for each mode comprises variable gain amplifiers (VGAs) which apply a forcing signal to the actuating means that is derived from the sensing means. The sustaining circuitry applies phase shift and gain to the signal obtained from sensing means to create the signal applied to actuating means. In this way, the sustaining circuits for each mode are nominally independent. Amplitude controllers adjust the gain of the VGAs in order to maintain a mechanical vibration of a particular amplitude.

1.3 Phase and Frequency Control Circuitry.

Optionally, the invention also comprises phase and frequency control circuitry connected to the resonator via sensing means and tuning means. The phase and frequency control circuitry actively sets the frequency split or phase relationship between the axes. This can be accomplished by detecting either the frequency or phase difference between the oscillations and adjusting the voltage on suitable tuning electrodes to set either the frequency or phase difference to a desired reference point. Optionally the value of the split can be adjusted dynamically to match gyroscope performance characteristics, such as angular random walk and drift to varying application requirements.

1.4 Output Circuitry.

The output circuitry includes means for conversion of the raw electronic signals obtained from sensing means of the resonator to a rotation rate that can be passed on to the user. The output circuitry comprises some or all of the following: frequency demodulators, rate and quadrature reference detectors, and rate and quadrature demodulators. The output circuitry is described in detail below for the different modes of operation.

1.5 Quadrature Frequency Modulated Mode of Operation.

The quadrature FM (QFM) mode of operation is defined by the condition where the phase difference between the oscillations is controlled to be substantially equal to +90 or −90 degrees. Preferably, the phase difference is exactly +90 or −90 degrees, but imperfections in the phase and frequency controller will introduce unwanted small deviations of up to a few degrees. The term 'substantially equal' in this context should be interpreted as including these unwanted deviations. For example, a phase difference of 85 degrees instead of the preferred 90 degrees would be considered substantially equal. Preferably, the phase difference is maintained between 45 and 135 degrees, more preferably it is maintained between 85 and 95 degrees. This is known as a quadrature phase relationship, hence the name quadrature FM (QFM). A constant phase difference between the axes implies exactly equal oscillation frequencies.

Figure 6:
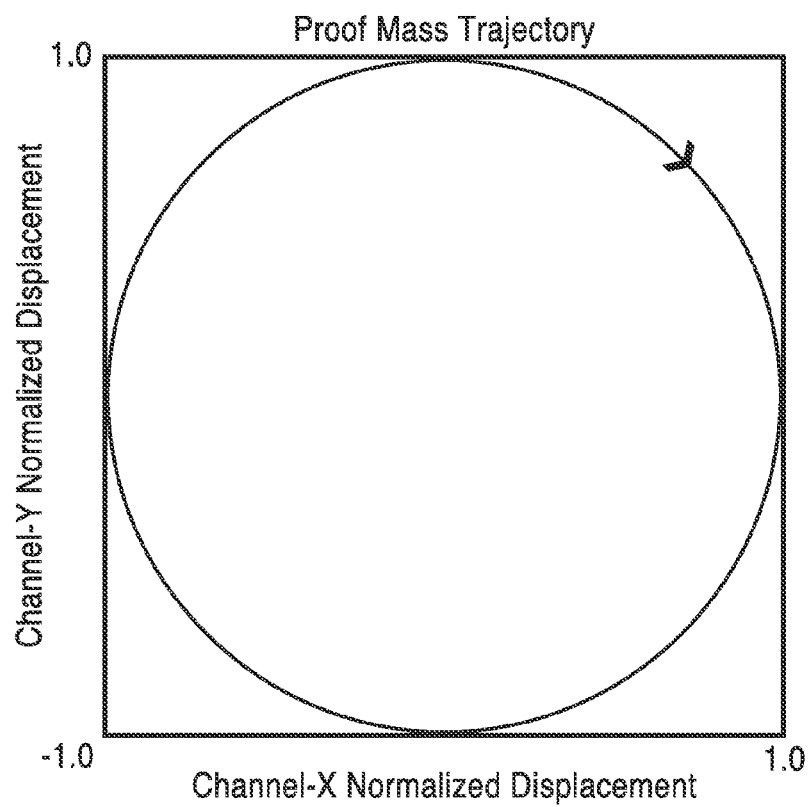
FIG. 6 is a graph of proof mass trajectory in the x-y plane of a gyroscope operating in QFM mode according to an embodiment of the present invention.
Figure 7:
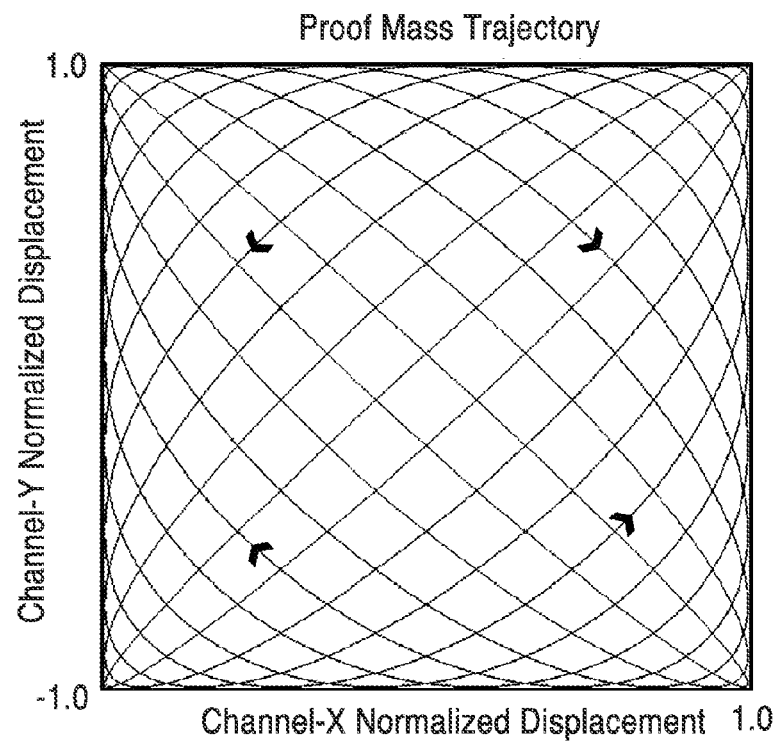
FIG. 7 is a graph of proof mass trajectory in the x-y plane of a gyroscope operating in LFM mode according to an embodiment of the present invention.

FIG. 6 and FIG. 7 depict circular and Lissajous orbits of the proof mass according to QFM and Lissajous frequency modulation (LFM), respectively.

Referring to FIG. 6 and the circular orbit of the proof mass in the QFM mode of operation, the frequency $\omega_c$, is set by either the x- or y-axis natural frequency, optionally adjusted by active electronic tuning. The axes have a master-slave relationship. One axis is chosen as the master and one as the slave. The slave axis oscillation is controlled to be substantially +90 or −90 degrees out of phase with the master by adjusting the slave-axis natural frequency with the slave-axis tuning electrode. Any phase shift other than 0 or 180 degrees with finite amplitude on each axis will result in FM sensitivity, but the signal-to-noise ratio is maximized when the oscillations are equal amplitude and in quadrature phase.

The output circuitry for the QFM mode of operation measures the oscillation frequency of each axis. In an ideal resonator having two modes coupled by Coriolis effect, the oscillation frequencies are given by:

$$\dot{\phi}_x = \omega_c - \alpha_z \frac{v_{ya}}{v_{xa}} \Omega_z \quad (1)$$

$$\dot{\phi}_y = \omega_c - \alpha_z \frac{v_{xa}}{v_{ya}} \Omega_z,$$

where $\alpha_z$ is the z-axis angular gain factor, dependent on the particular gyroscope mechanical geometry. Typical values of $\alpha_z$ are in the range 0.3 to 1. Variables $v_{xa}$ and $v_{ya}$ denote the velocity amplitudes of the x- and y-axis oscillations, respectively. The sum of the frequencies is then:

$$\dot{\phi}_x + \dot{\phi}_y = \Sigma \dot{\phi}_{xy} = 2\omega_c - \alpha_z \Omega_z \left( \frac{v_{ya}}{v_{xa}} + \frac{v_{xa}}{v_{ya}} \right). \quad (2)$$

The sum of the reciprocals of velocity amplitudes is to first order insensitive to small changes in velocity when $v_{xa} \approx v_{ya}$. In the preferred embodiment, the velocity amplitudes are set substantially equal in order to ensure a stable scale factor. Preferably, the velocity amplitudes are exactly equal, but imperfections in the amplitude controllers will introduce unwanted small deviations of up to a few percent. The term 'substantially equal' should be interpreted as including these unwanted deviations. For example, a velocity mismatch of 10% is considered substantially equal. Although the sum of the frequencies will provide a more stable scale factor, it is evident from Eq. (1) that measurement of only one frequency is sufficient to detect rate.

Including the effects of parasitic damper and spring coupling between the axes, Eq. (2) for $v_{xa} = v_{ya}$ simplifies to:

$$\Sigma \dot{\phi}_{xy} = 2(\omega_c + \beta_{xy} - \alpha_z \Omega_z). \quad (3)$$

A measurement of the sum of the frequencies produces a result containing the rate signal in addition to offset terms $\omega_c$ and $\beta_{xy}$. The scale factor of the measurement depends only on the angular gain factor $\alpha_z$, and the offset is set by the sum of the circular orbit frequency $\omega_c$ and cross-damper $\beta_{xy}$. The offset $\omega_c$ is problematic as it is relatively large compared to the signal and is typically sensitive to temperature. Solutions to this problem will be described later in this document, after discussing important benefits of QFM gyroscopes.

First, the QFM rate bandwidth is not restricted by the resonator bandwidth, as implied by the absence of $\beta_x$ and $\beta_y$ from Eq. (3). Consequently, the QFM gyroscope is not subject to the trade-off between bandwidth and scale factor. Second, the QFM device benefits from the same angle random walk improvement as a mode matched conventional gyroscope. Everything else being equivalent, the angle random walk contribution from the electronics reduces by the factor $\Delta \omega_o / \beta$, which typically amounts to an improvement at or above two orders of magnitude. Third, it is trivial to match the modes of the QFM gyroscope since the natural frequencies are continuously observable. Fourth, the scale factor of the measurement is extremely stable, as it is set by the sum of reciprocal velocity ratios, which is insensitive to small changes in velocity to the first order when the velocities are nominally equal. For example, a velocity mismatch of as much as 1400 ppm between the axes translates into a scale factor variation of only 1 ppm for a gyroscope with nominally matched velocities. And fifth, the QFM gyroscope allows both vibration modes to participate in forming the rate output, which gives twice the signal and results in improved sensitivity.

1.5.1 Implementation of the QFM Gyroscope.

Figure 8:
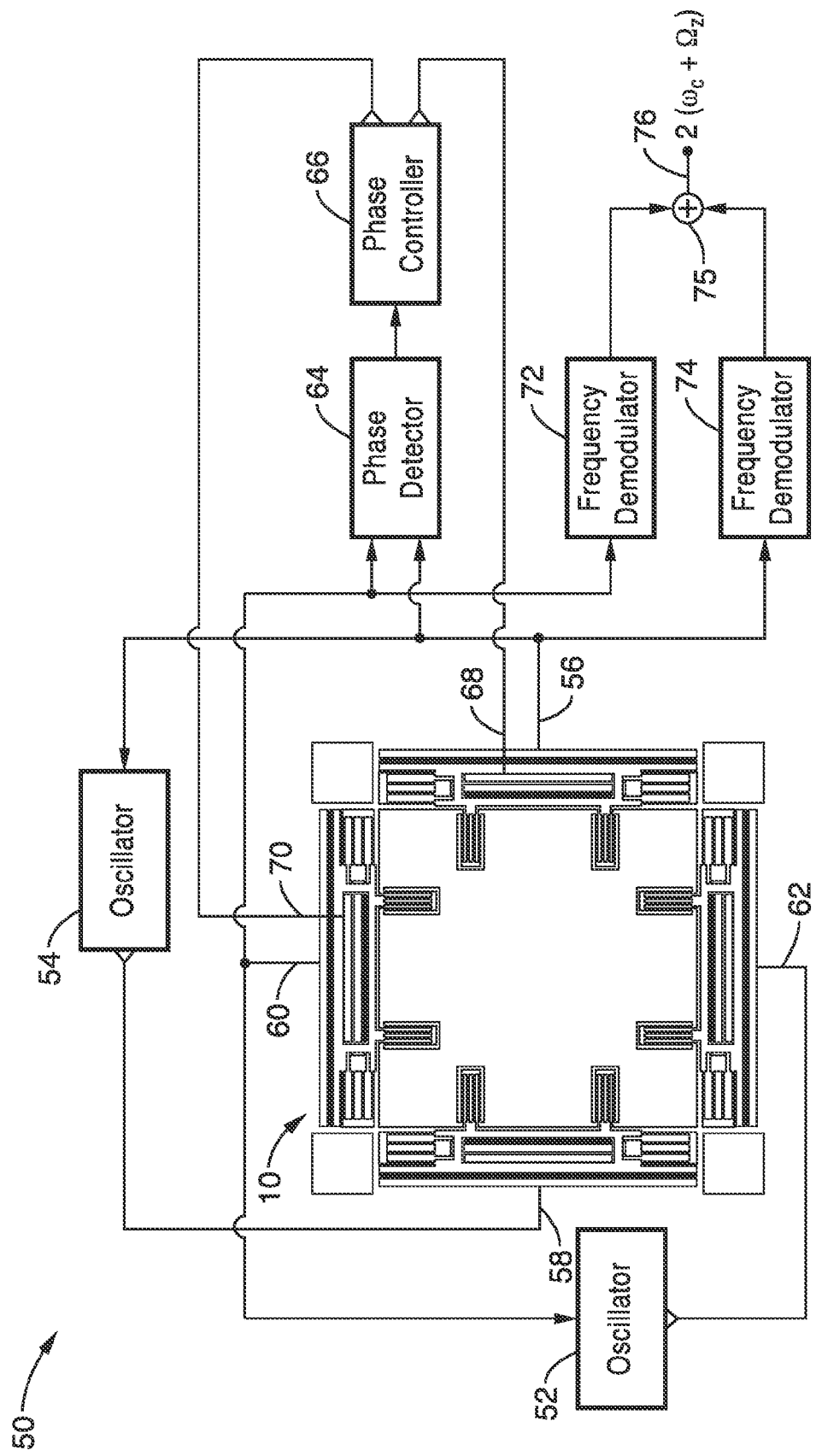
FIG. 8 is a block diagram of a QFM gyroscope according to an embodiment of the present invention.

FIG. 8 illustrates an example embodiment 50 of a QFM gyroscope system. The resonator 10 is as shown in FIG. 3 and described in the previous sections.

The sustaining circuitry consists of two oscillators 52 and 54, which sustain oscillations on the x- and y-axes respectively. The oscillators use one parallel plate or comb electrode for sensing the displacement or velocity and the other for applying a force to the proof mass. In the figure, the transducer is shown with a comb electrode sense terminal output 56, and a comb electrode drive terminal 58 connected from x-axis oscillator 54. Similarly, the y-axis oscillator 52 receives input from comb sense output 60 and drives a comb electrode drive terminal 62 of the y-axis. Amplitude regulation in the oscillators enforces the equal amplitude condition.

The phase and frequency control circuitry consist of phase detector 64 and phase controller 66 which set the quadrature phase condition. Phase detector 64 produces an output which is representative of the phase difference between the x- and y-axis oscillations. The phase controller 66 maintains the measured phase difference equal to +90 or −90 degrees by adjusting tuning electrode voltages on either or both axes of the gyroscope transducer. The transducer has an x-axis tuning electrode 68, and a y-axis tuning electrode 70 connected to outputs from phase controller 66.

In the preferred embodiment, the phase controller 66 adjusts the axis with the higher natural frequency to be 90 degrees out of phase with the axis with the lower natural frequency. This effectively creates the described master-slave relationship between the axes. The oscillation frequency of the lower frequency axis is uncontrolled, and the higher frequency axis is slaved to this frequency by adjusting the corresponding axis tuning electrode. This slave configuration advantageously makes the circular orbit frequency independent of any absolute bias voltages.

Possible variations on this concept includes a method in which the master natural frequency is first adjusted with tuning electrodes, or alternatively, adjusting both tuning signals in opposite directions. The latter approach is problematic with electrostatic parallel plate tuning electrodes, as the natural frequency can only be decreased. Adding a constant DC bias voltage to each tuning electrode overcomes this limitation, with the caveat that the circular orbit frequency is dependent on the applied DC bias.

The combination of phase detector 66, phase controller 68, and axis tuning electrodes on the transducer form a phase-locked-loop (PLL), where one or both of the x- and y-axis oscillators act as a voltage controlled oscillator. The phase relationship is maintained at +90° or −90° through closed loop negative feedback that adjusts the frequency of one or both axes.

As explained in the previous section, in the QFM gyroscope, the frequency of each axis is measured to form the rate estimate. The output circuitry comprises frequency demodulators 72 and 74, which demodulate the input x- and y-axis FM signals, respectively. Assuming equal amplitudes and quadrature phase, the frequencies of both axes are equal, each containing the sum of rate and circular orbit frequency, as in Eq. (1). Therefore, an output 76 is generated which equals $2(\omega_c+\Omega_z)$ from summing 75 the two frequencies.

It is not necessary to sum the two frequencies in order to detect angular rate, as indicated by Eq. (1). Each frequency contains the rate information. If scale factor stability is not a concern, one frequency demodulator can be eliminated.

An alternative embodiment for summing the frequencies involves first multiplying signals 56 and 60 of FIG. 8 together, to produce a signal that contains the sum and difference of the frequencies of the input waveforms. A high pass filter removes the difference frequency. A frequency demodulator then can be utilized to directly measure the sum of the frequencies.

In one embodiment, the frequency demodulators produce a digital output which is subsequently processed by circuitry, such as by utilizing a microcontroller, ASIC, FPGA, or combination thereof to form the final rate estimate.

1.5.2 Subsystems of the QFM Gyroscope.

Figure 9A:
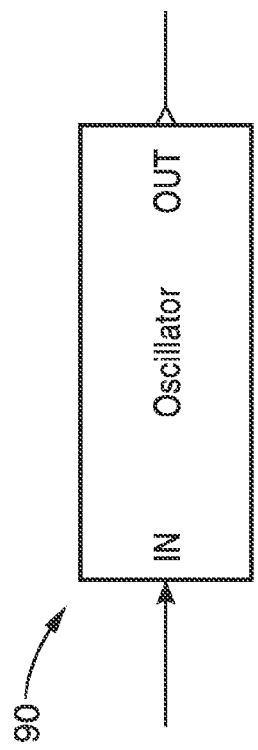
FIGS. 9A and 9B are an oscillator symbol and schematic utilized according to at least one embodiment of the present invention.
Figure 9B:
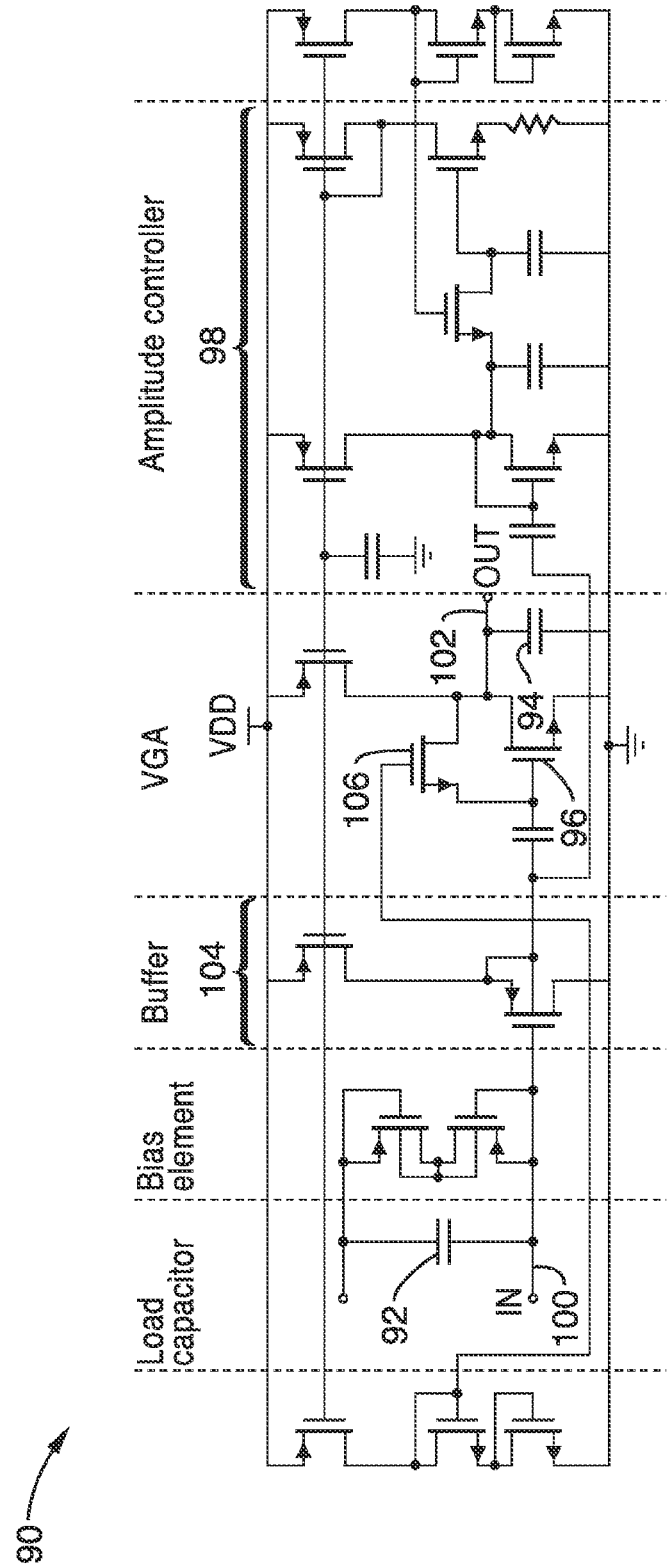

FIG. 9A is a symbol for an oscillator 90, whose schematic is shown in FIG. 9B. The oscillator 90 preferably comprises a Pierce oscillator which can be utilized to implement oscillator blocks 52 and 54 seen in FIG. 8. This is the preferred embodiment of the oscillator due to its simplicity, high performance, and low power consumption. The oscillator is shown with states for load capacitance, bias element, buffer, variable gain amplifier (VGA), and amplitude controller.

The Pierce oscillator 90 consists of load capacitors 92 and 94, an amplifying transistor 96, and an amplitude regulator section 98, which adjusts the gain of transistor 96 to create an overall unity loop gain when the amplitude reaches the desired amplitude set-point. The set-point in this case is set by a thermal voltage reference integrated into the amplitude controller. The combination of load capacitors 92 and 94 and transistor 96 create approximately 360 degrees of total phase shift between the proof mass velocity, replicated by the current flowing into the IN terminal 100, and the driven force, replicated by the voltage present at the OUT terminal 102. Therefore, the loop will oscillate at nearly the natural frequency of the transducer axis. In the specific oscillator embodiment shown in FIG. 9B, a voltage buffer 104 is included that precedes amplifying transistor 96. Buffer 104 is configured to provide isolation between the triode-mode device 106 and the resonator. Otherwise, the current noise contributed by the device 106 would dominate the noise of the Pierce oscillator.

Possible variations on oscillator design include utilizing any of the following: a CMOS inverter oscillator, symmetric parallel or series oscillators, or a Van den Homberg oscillator. The oscillator can also be implemented with a phase locked loop (PLL), which generates a clock +90 degrees out of phase with the input displacement signal and then uses a scaled version of the generated clock to drive the gyroscope axis. An amplitude controller could be used in combination with the PLL to scale the generated clock to the appropriate level to maintain a desired displacement or velocity amplitude set-point. One of ordinary skill in the art will appreciate that many other oscillator architectures can be utilized without departing from the teachings of the present invention.

FIG. 10A is a symbol for a combination phase detector and controller 130, with a block diagram of this example embodiment shown in FIG. 10B with a phase detector 132 and phase controller 134. The phase 132 detector can be implemented with a combination of a multiplier 136, shown receiving signals IN1 and IN2, and a low pass filter 138. It should be appreciated that the multiplier according to the invention can be implemented in a number of ways, including in the analog domain as a mixer or Gilbert cell. Alternatively, the signals could first be digitized, and the multiplication could be performed in the digital domain. The output of the multiplier is the sum of sinusoids with frequencies equal to the difference and sum of the input frequencies. The component at the higher frequency is removed by the low pass filter 138. When the input signals are equal in frequency and in quadrature phase as enforced by the controller, the output of the low pass filter 138 is zero.

The proportional-integral-derivative (PID) controller 140 enforces this condition by adjusting voltages on the tuning electrodes. A switch 142 determines which output the PID controller is connected to. As described previously, the controller should be connected to the axis with the higher resonant frequency. The proof mass bias voltage 148, 150 are added at sum circuits 144, 146 to the output of the PID controller to linearize the controller outputting signals OUT1, OUT2. The PID controller 140 output is a feed-forward signal that sets the tuning electrode voltage equal to the proof mass bias voltage in which case no tuning is required.

Phase detector 132 and controller 134 can be implemented in various ways without departing from the teachings of the present invention, as will be recognized by one of ordinary skill in the art. For example, in one variation the oscillation signals are digitized, and phase detector 132 and phase controller 134 are implemented in the digital domain, followed by a DAC to generate tuning voltages.

Figure 11A:
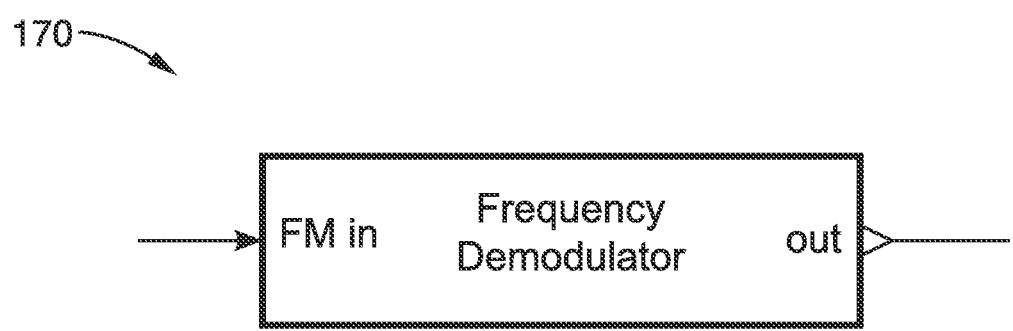
FIGS. 11A and 11B are a frequency demodulator symbol and schematic utilized according to at least one embodiment of the present invention.
Figure 11B:
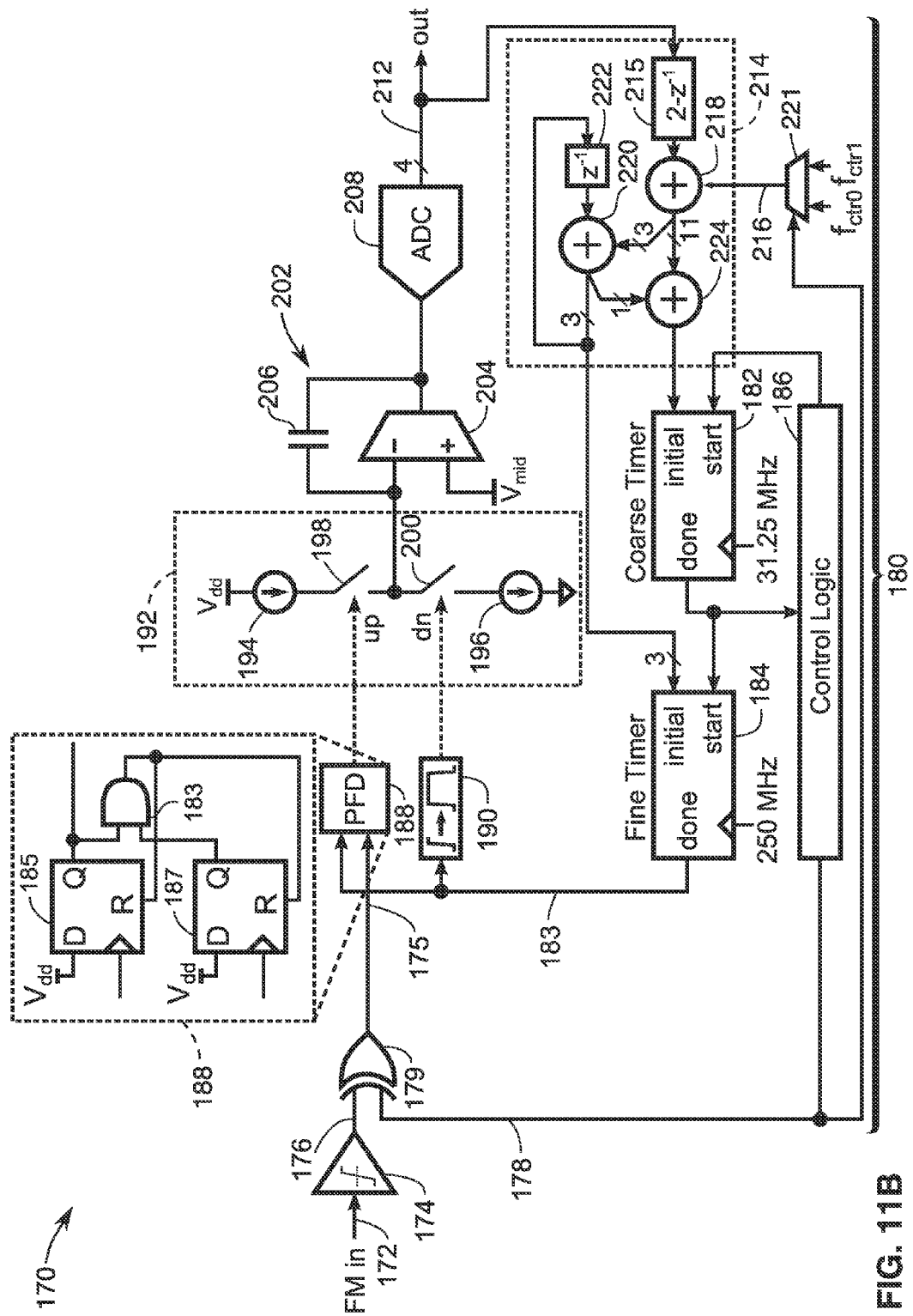

FIG. 11A is a symbol for a frequency demodulator 170, with a block diagram of this example embodiment shown in FIG. 11B.

Referring to FIG. 11B, the sinusoidal output of oscillator 172 is received at continuous-time comparator 174, which converts it to a square wave FM signal 176 for receipt by a delta-sigma frequency-to-digital converter (ΔΣFDC) 180. FM signal 176 is then processed by the exclusive-OR gate 179, which multiplies it by edge selection signal 178, thus resulting in a frequency-doubled signal 175 which is fed to the phase-frequency detector (PFD) 188. By way of example and not limitation, PFD 188 comprises two D-flip flops 185, 187 receiving signals 175, 183 at their clock inputs, and having their D inputs pulled up to $V_{dd}$, with Q outputs coupled through AND gate 183 to drive both reset (R) inputs.

Switches 198 and 200, and current sources 194 and 196 comprise charge pump 192, which outputs a pulse of charge proportional to the phase difference between signals 175 and 183. The output of the phase-frequency detector 188 controls switch 198, which enables current source 194. The fine timer 184 outputs a "done" signal 183 received by edge-to-pulse converter 190, which enables "down" switch 200 for a fixed period of time (e.g., 32 ns). The charge pulse is integrated by the active integrator 202 comprising operational transconductance amplifier 204 and feedback capacitor 206. The voltage across capacitor 206 is quantized by analog-to-digital converter 208, producing the digital output signal 212. This signal is fed to arithmetic block 214, which computes the values to be loaded into coarse timer 182 and fine timer 184. Output signal 212 is first processed by loop filter 215 upon which adder 218 adds a center frequency offset 216. The result is then split, with the least significant bits directed to adder 220, which together with register 222 comprises a digital integrator. The output of adder 220 is fed to fine timer 184 and to register 222. Adder 224 sums the most significant bits from adder 218 with the carry bit from adder 220, with the result coupled to coarse timer 182. Control logic block 186 generates edge selection signal 178, which is toggled after every phase comparison. This signal is used by XOR gate 179 to convert falling edges to rising edges, and is also used by multiplexor (mux) 221 to select one of two values for center frequency 216, which enables the loop to handle signals with an asymmetric duty cycle without requiring a large input frequency range. Output 212 of the ΔΣFDC 170 is a 2nd order sigma-delta modulated version of the input oscillation frequency. It is effectively a digital signal representative of the oscillation frequency which is preferably further processed by a DSP, ASIC, or FPGA to extract input angular rate, based on calculations such as described in Eqs. 1-3.

To reduce power, the coarse timer (e.g., an 11-bit counter) 182 runs at a reduced clock rate, with correspondingly low time resolution. The coarse timer is used to enable a fine timer (e.g., a 3-bit counter) 184 near the time of the input edge. As an example, the coarse timer receives a clock with a period of 32 ns (31.25 MHz), while the fine timer receives a clock with a period of 4 ns (250 MHz). Because fine timer 184 effectively only delays the "done" signal of the coarse timer 182, it is necessary to integrate the timer input so that all future edges are delayed by the same amount. This is performed by a modulo integrator comprised of adder 220 and register 222. The carry bit is fed to adder 224, which adds one extra cycle of delay to the coarse timer when the modulo integrator wraps around.

In order to avoid nonlinearity due to mismatch between the up current 194 and down current 196, the down current source 196 is switched on using switch 200 for a constant duration (e.g., 32 ns) during every phase comparison cycle. The on-duration is set by pulse generator 190. The top current source 194 is switched on and off through switch 198. Current source 194 is switched on in response to output 183 from fine counter 184, which causes the output of D flip-flop 185 to go high. The rising edge of signal 175 produced by XOR gate 179 causes the output of D flip-flop 187 to go high; this causes the output of AND gate 183 to go high, resetting flip-flops 187 and 185 and turning off switch 198. Any mismatch between the two current sources 194 and 196 manifests itself as a static phase offset between signals 175 and 183; since the frequency demodulator measures the time derivative of phase, this offset is effectively eliminated and does not appear at the output 212.

While the delta-sigma frequency-to-digital converter (ΔΣFDC) is a preferred embodiment for frequency measurement due to its excellent linearity and scale factor accuracy, numerous other circuit architectures can be used to extract rate information from the frequency-modulated signal. A conventional analog PLL can be used to demodulate FM, though scale factor stability and linearity is limited by the analog accuracy of the VCO. Another architecture which can be utilized comprises a slope discriminator followed by an envelope detector; this architecture is also subject to analog imperfections. Another possible implementation comprises a high-resolution analog-digital converter to directly digitize the sinusoidal signal from the oscillators, with the FM discrimination and further signal processing performed by a digital signal processor (e.g., comprising a programmable IC and/or a fixed-function application-specific integrated circuit (ASIC)). Another option is to measure the period of the FM signal directly, using either a high-resolution time-todigital converter or a frequency counter. One of ordinary skill in the art will appreciate that various other methods of FM demodulation, or frequency measurement, may be alternatively utilized or adapted to work with the teachings of the present invention.

1.6. Dual QFM Operating Mode.

In the QFM gyroscope, the output signal contains the circular orbit frequency $\omega_c$ as an offset. This term typically has a relatively large temperature dependence. For example, the temperature coefficient of the Young's modulus in Silicon results in about −30 ppm/K shift of the mechanical resonant frequency with temperature. For example, for a 10 degree/hour gyroscope, the required frequency stability is 7.7 µHz, or 0.26 ppb relative to an assumed 30 kHz nominal resonant frequency. This would require the temperature to be controlled to maintain within 8.6 µK, which is beyond the capabilities of any practical integrated thermometer and temperature regulator.

Figure 12A:
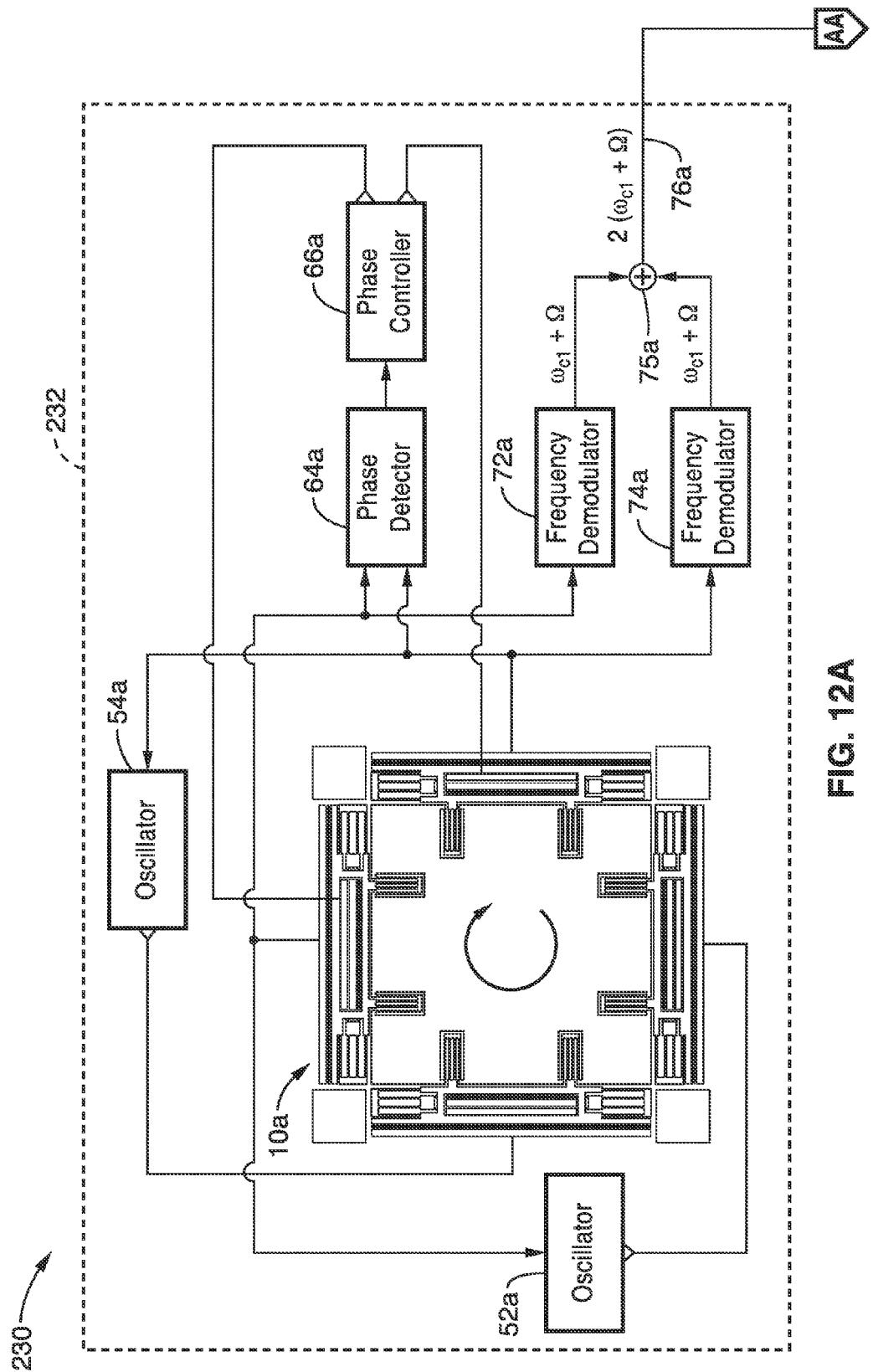
FIG. 12A and FIG. 12B are a block diagram of a dual gyroscope QFM system according to an embodiment of the present invention.
Figure 12B:
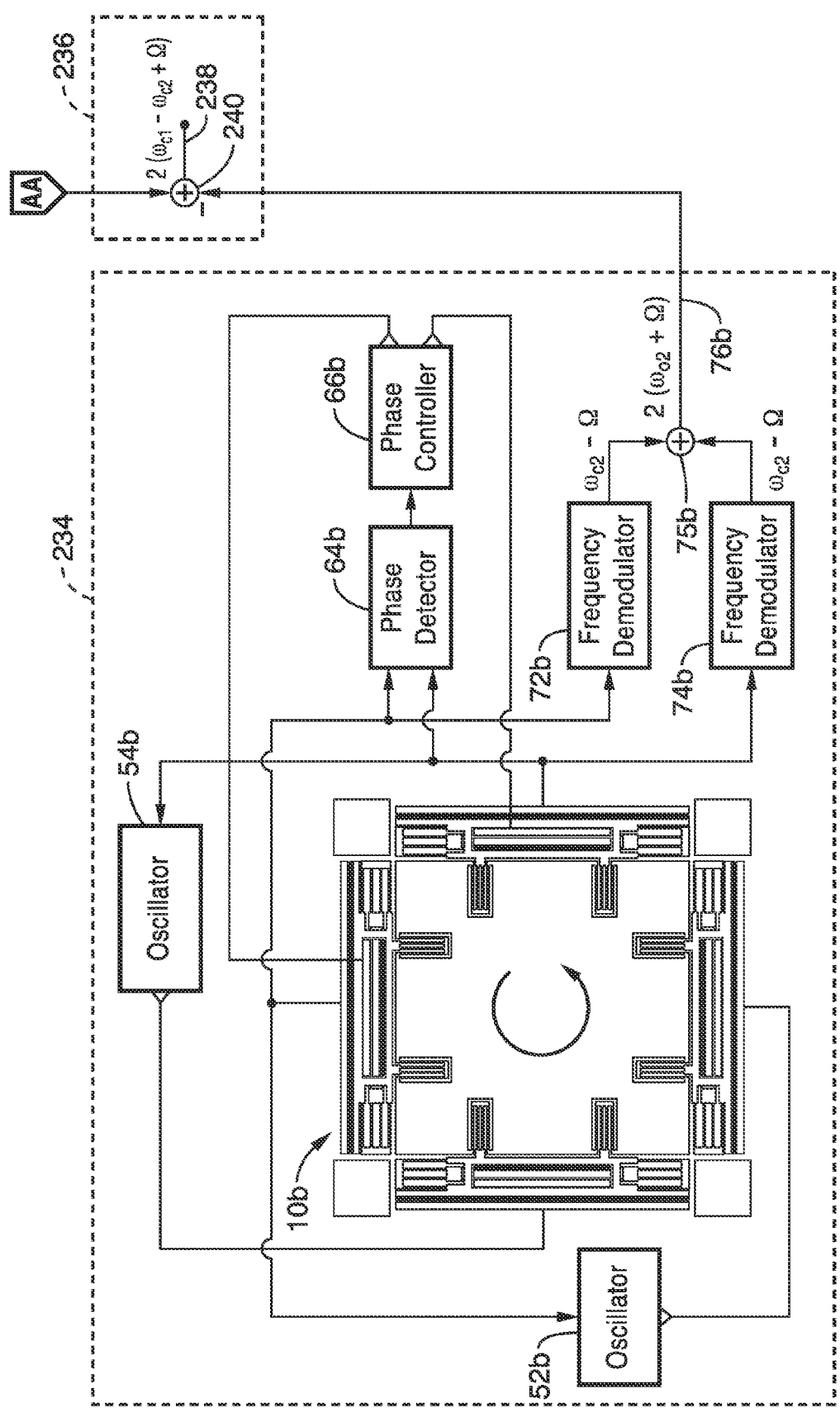

FIG. 12A and FIG. 12B illustrate an example dual gyroscope QFM embodiment 230 which overcomes the circular orbit offset issue described above. Two identical QFM gyroscopes 232, 234 are mounted in close proximity and summed 236. Each gyroscope is shown with the resonator 10a, 10b, as was seen in FIG. 8 along with the other component blocks, including oscillators 52a, 52b, 54a, 54b, phase detectors 64a, 64b, phase controllers 66a, 66b, frequency demodulators 72a, 72b, 74a, 74b, summing junction 75a, 75b, and outputs 76a, 76b, which are combined into final output 238 at summing junction 240. Due to fabrication imperfections, the two resonators utilized in the dual gyroscope QFM configuration will not match perfectly. In particular, the circular orbit frequencies will generally differ by a small amount, typically on the order of a percent or less. The first circular orbit frequency is $\omega_{c1}$, and the second circular orbit frequency is $\omega_{c2}$.

In a preferred embodiment, the close proximity of the resonators is achieved by integration onto the same die to ensure matching temperatures. By configuring one gyroscope to orbit in the opposite direction of the other, an equal and opposite sensitivity to rate is achieved. Changing the direction of the orbits requires only changing the phase shift between the oscillations by 180 degrees, i.e., the phase difference between the x- and y-axes is 90° for the first gyroscope and −90° for the second gyroscope. In the preferred embodiment of the controller, this can be accomplished by reversing the sign of the gain in the PID (140 in FIG. 10B). The difference of the frequency outputs of the two QFM gyroscopes results in the output rate 238. The output rate contains a residual offset equal to the difference of the two circular orbit frequencies, which are not necessarily equal.

The temperature coefficient of the measurement is attenuated by an amount $(\omega_{c1}-\omega_{c2})/(\omega_{c1}+\omega_{c2})$, which can be on the order of 0.001 or less. For Silicon this corresponds to a temperature coefficient of about 30 ppb/K, translating into a requirement for the temperature to vary by no more than 8.6 mK to contribute less than 10 degree/hour bias variation.

1.6.1 Phase Readout of Dual QFM Gyroscope.

Figure 13A:
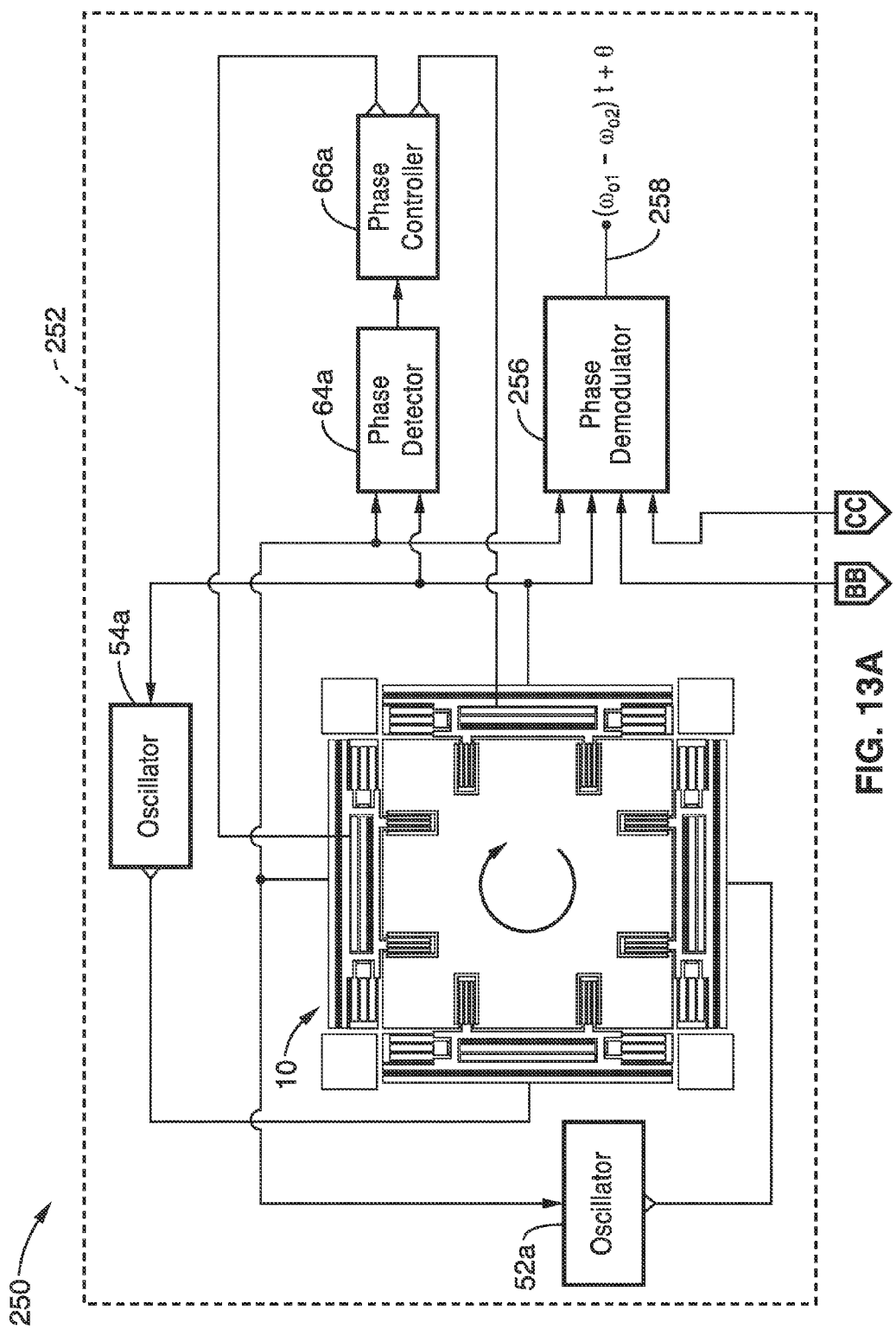
FIG. 13A and FIG. 13B are a block diagram of a dual gyroscope QFM system with rate-integrating readout according to an embodiment of the present invention.
Figure 13B:
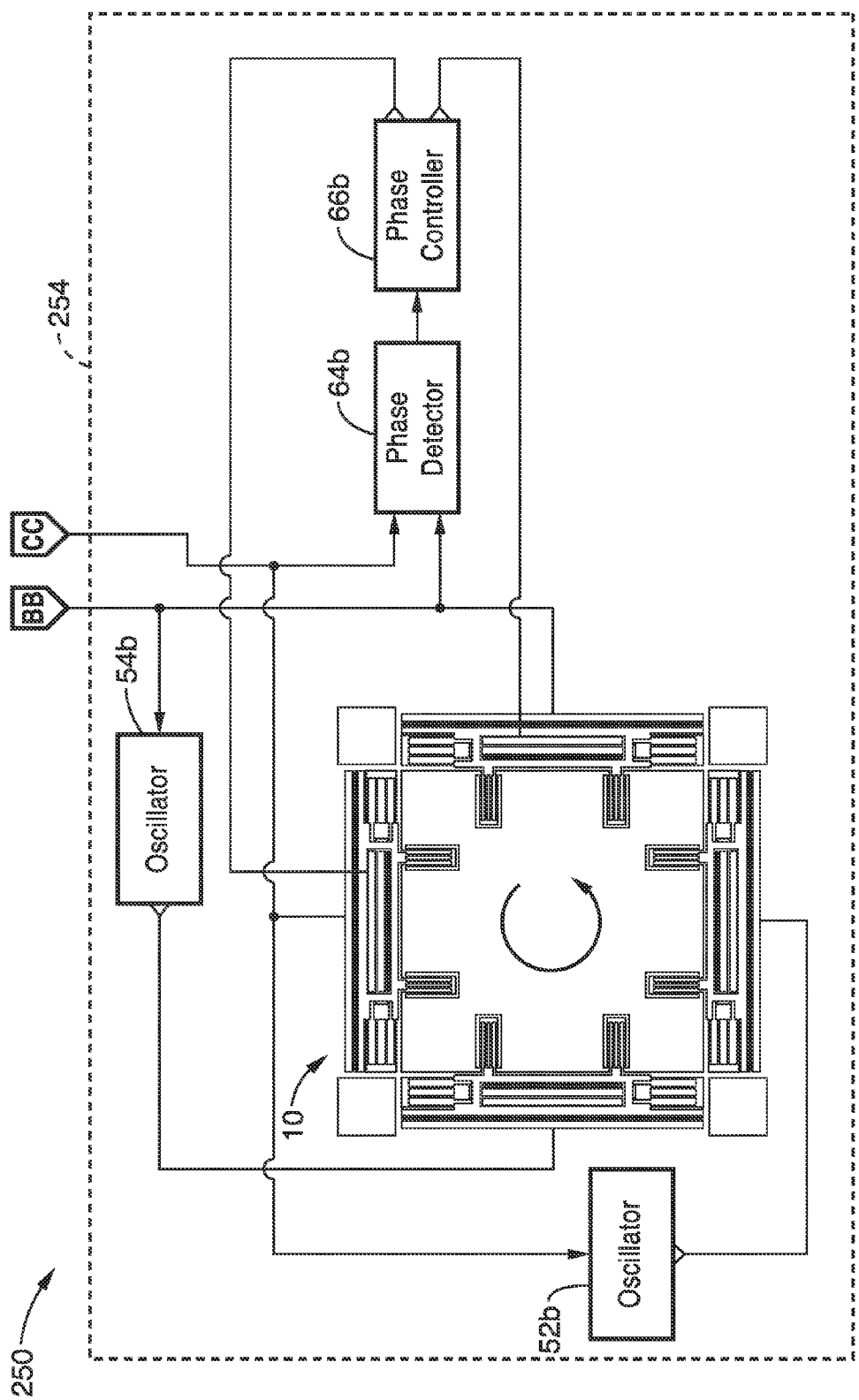

FIG. 13A and FIG. 13B illustrate an example embodiment 250 of alternative output circuitry for the dual QFM gyroscope. In similar manner to FIG. 12A and FIG. 12B, two identical QFM gyroscopes 252, 254 are utilized with transducers 10a, 10b, oscillators 52a, 52b, 54a, 54b, phase detectors 64a, 64b, and phase controllers 66a, 66b. However, a phase demodulator 256 is configured to directly measure the phase difference between the two gyroscope oscillations to generate an output 258. Because the phase difference between the two oscillations is the integral of the frequency difference, this produces an output that is proportional to angle instead of angular rate. An advantage of this approach is that there is no extra clock needed to perform the signal demodulation.

Figure 14A:
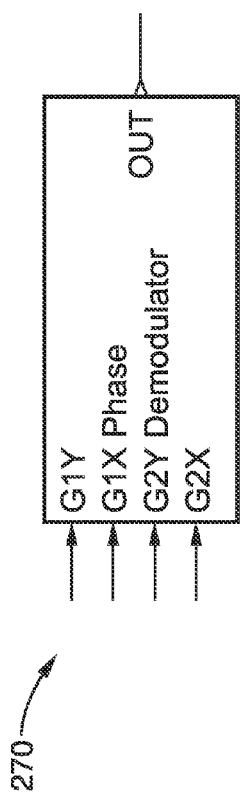
FIG. 14A and FIG. 14B are a phase demodulator symbol and block diagram for an angle readout for the dual gyroscope of FIG. 13B, utilized according to at least one embodiment of the present invention.
Figure 14B:
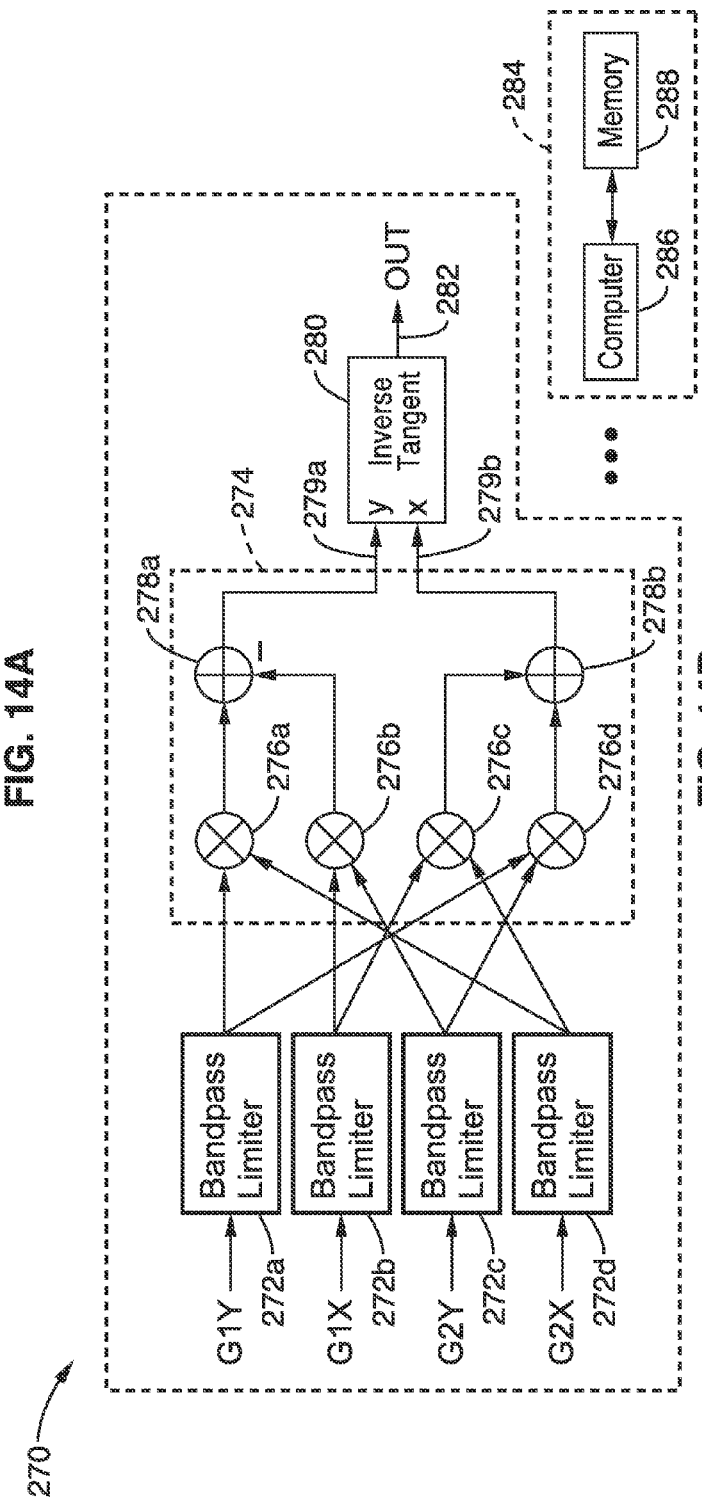

FIG. 14A is a symbol for a phase demodulator 270, with an example embodiment shown in FIG. 14B. Band-pass limiters 272a, 272b, 272c, 272d, remove any residual amplitude information from the input signals and produce sinusoidal outputs. Signal processing block 274, exemplified with multipliers 276a, 276b, 276c, 276d and adders 278a, 278b, produces the sine 279a $\sin(\varphi_x-\varphi_y)$ and cosine 279b $\cos(\varphi_x-\varphi_y)$ of the phase difference of the oscillations from the outputs of the band-pass limiters. The sine and cosine signals 279a, 279b are received at inverse tangent block 280 atan 2 (y,x) which is configured to determine (e.g., calculate) phase difference between the oscillations and generate output 282. The phase demodulator 270 is well-suited for digital implementation, where the input signals to the band-pass limiters are first digitized by ADCs. By way of example, a processing element 284 is shown comprising at least one computer 286 and memory 288 for executing the method steps to calculate phase difference. It will be appreciated that the processing element shown may be utilized for performing phase demodulation, and other functions as well as controlling device operation, with each of the embodiments described herein without departing from the teachings of the present invention.

1.7 Lissajous FM Operating Mode.

In FIG. 7, an operating mode was shown with proof mass motion following a Lissajous pattern. The present invention utilizes this pattern with the configurations to generate an FM output, in a Lissajous FM mode of operation. The LFM mode of operation is defined by the case where there is a non-zero static frequency difference between the axes, that is to say there is a non-zero average oscillation frequency difference. The frequency difference could be set by the difference in mechanical resonant frequencies or it could be adjusted to a desired reference via closed loop control using tuning electrodes.

The LFM gyroscope, also called Lissajous Frequency Modulated gyroscope, generalizes the principles of QFM for the case where the modes of the resonator are not matched. Rate measurement is also based on observing the instantaneous oscillation frequencies of each axis. For an ideal resonator having two degrees of freedom these relationships are given by the following:

$$\dot{\phi}_x = \omega_{ox} - \alpha_z \frac{v_{ya}}{v_{xa}} \Omega_z \sin\Delta\phi_{xy} \qquad (4)$$

$$\dot{\phi}_y = \omega_{oy} - \alpha_z \frac{v_{xa}}{v_{ya}} \Omega_z \sin\Delta\phi_{xy}$$

where $\Delta\varphi_{xy}$ is the phase difference between the x and y oscillations. If this phase difference is equal to +90 or −90 degrees, the equations reduce to those given for QFM operation, thus LFM is a more general form of QFM. In LFM, the phase difference $\Delta\varphi_{xy}$ is time varying. If $v_{xa} \approx v_{ya}$, the phase difference is nearly equal to $$\Delta\varphi_{xy} \approx (\omega_{ox}-\omega_{oy})t. \qquad (5)$$

Substituting Eq. (5) into Eq. (4), the following is obtained:

$$\dot{\phi}_x = \omega_{ox} - \alpha_z \frac{v_{ya}}{v_{xa}} \Omega_z \sin(\Delta\omega_0 t) \qquad (6)$$

$$\dot{\phi}_y = \omega_{oy} - \alpha_z \frac{v_{xa}}{v_{ya}} \Omega_z \sin(\Delta\omega_0 t)$$

where $\Delta\omega_o = \omega_{ox} - \omega_{oy}$. Eq. (6) illustrates that the angular rate signal is modulated up to the frequency $\Delta\omega_o$, allowing it to be separated from large drive signals and variations at or near the natural frequencies $\omega_{ox}$ and $\omega_{oy}$. The output circuit first measures the frequencies $\varphi_x$ and $\varphi_y$ using FM demodulation. The measured frequencies are then AM demodulated to extract the final rate signal. The AM demodulation is performed by multiplication of Eq. (4) with sin $\Delta\varphi_y$ to recover the rate signal. It is always possible to reconstruct the demodulation reference, as the phase difference $\Delta\varphi_{xy}$ is directly observable.

Reconstruction of the demodulation reference is accomplished with a rate reference detector, and the final AM demodulation is done with a rate demodulator, both of which will be described in detail. The rate demodulator recovers the frequency amplitude component of the measured frequency that is in-phase with the rate reference. For example, in Eq. (6), the rate reference detector should produce a signal containing sin $\Delta\varphi_{xy}$. The rate demodulator would then produce a signal which is the amplitude of the measured frequency component in-phase with sin $\Delta\varphi_{xy}$. For example, for the first equation of (6), the amplitude of the measured frequency component in-phase with sin $\Delta\varphi_{xy}$ is $$\alpha_z \frac{v_{ya}}{v_{xa}} \Omega_z.$$

After the AM demodulation step and assuming equal velocity amplitudes, the final result is:

$$h_{LP} \otimes (\Sigma\dot{\varphi}_{xy} \sin \Delta\varphi_{xy}) = -\alpha_z \Omega_z \quad (7)$$

where the operator $\otimes$ denotes convolution and $h_{LP}$ is the impulse response of a low pass filter used to remove the undesired image signal component $\cos(2\Delta\varphi_{xy})$ at twice the modulation frequency that results from the AM demodulation. Eq. (7) holds even in the presence of non-zero cross coupling spring $k_{ij}$ and damper $\beta_{ij}$ terms. Rejection of the cross damping error is unique to LFM operation with intentional mismatch of the modes. It significantly reduces the sensitivity of the gyroscope output to slowly varying drift, such as arises in response to temperature variations and which substantially reduces the zero rate output of the gyroscope compared to the conventional operating mode. The LFM benefits from the same scale factor stability advantages described already for QFM for $v_{xa} \approx v_{ya}$.

In a three degree of freedom LFM gyroscope, a single proof mass can be used to measure angular rate about three axes. Each axis is driven into self-oscillation at the axis natural frequency. The sum of the frequencies of the three oscillations is given by:

$$\Sigma\dot{\varphi}_{xyz} = \omega_{ox} + \omega_{oy} + \int_{oz} - 2\alpha_z \Omega_z \sin \Delta\varphi_{xy}$$

$$-2\alpha_y \Omega_y \sin \Delta\varphi_{xz} - 2\alpha_x \Omega_x \sin \Delta\varphi_{yz} \quad (8)$$

The rate signals appear at three separate frequencies, $\Delta\dot{\varphi}_{xy} \approx \omega_{ox} - \omega_{oy}$, $\Delta\dot{\varphi}_{xz} \approx \omega_{ox} - \omega_{oz}$, and $\Delta\dot{\varphi}_{yz} \approx \omega_{oy} - \omega_{oz}$. Each rate component can be demodulated by filtering out the unwanted components and multiplying by the sine of the phase difference between the other two axes.

The LFM and QFM gyroscope benefits are summarized in Table 1. In comparison to QFM, the LFM gyroscope eliminates the offset due to $\omega_c$ and $\beta_{xy}$, but has the same noise performance and bandwidth as a mode-mismatched conventional gyroscope. However, the LFM gyroscope can be operated with much smaller frequency splits than can be practically realized with conventional gyroscopes where the scale factor and bandwidth are strong functions of matching accuracy which is difficult to observe and hence maintain.

1.7.1 Implementation of LFM Gyroscope.

Figure 15:
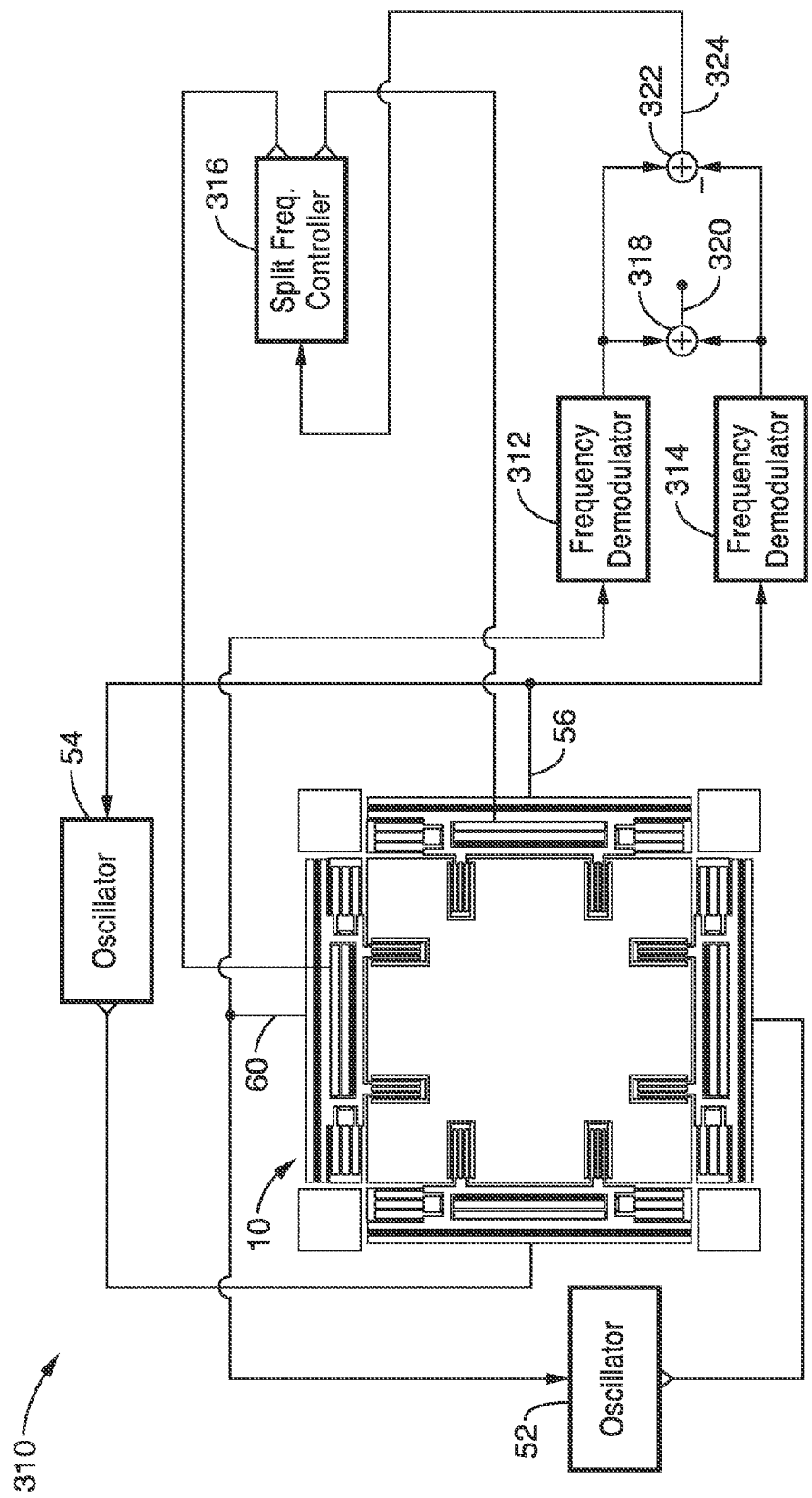
FIG. 15 is a block diagram for an LFM gyroscope according to an embodiment of the present invention.

FIG. 15 illustrates an example embodiment 310 of a single axis LFM gyroscope. As in other embodiments, the sustaining circuitry consists of oscillators 52, 54, seen driving resonator 10 in response to oscillation signals 56 and 60. Resonator 10 is connect via sensing means (e.g., comb sensors) to frequency demodulators 312, 314 are seen whose outputs are summed at summing circuit 318 generating a first output 320. It should be appreciated that output 320 is utilized at an LFM demodulator, such as input 390 in FIG. 17B. As previously described, the output circuitry comprises some or all of the following: frequency demodulators, rate and quadrature reference detectors, and rate and quadrature demodulators. A difference is also determined at summing circuit 322 generating output 324, which is received by a split frequency controller 316. One difference between LFM and QFM modes is that the phase shift is no longer controlled to +90 or −90 degrees. The oscillators are allowed to run at two different frequencies. The difference between the oscillation frequencies is called the split frequency.

The LFM gyroscope system optionally includes phase and frequency control circuitry consisting of a split frequency controller. The split frequency controller 316 adjusts the voltage on the tuning electrodes in order to set the split frequency to a desired set-point. In the absence of a split frequency controller 316, the split frequency is set by the difference of the mechanical resonant frequencies. The split frequency controller is shown operating in response to receiving a signal 324 as $\omega_{ox} - \omega_{oy}$, which is the difference determined at sum junction 322 from the outputs of frequency demodulators 312, 314. It will be noted that frequency demodulator 312 outputs a signal $\omega_{oy} - \Omega_z \sin \Delta\varphi_{xy}$, while frequency demodulator 314 outputs a signal $\omega_{ox} - \Omega_z \sin \Delta\varphi_{xy}$. An output 320 as $\omega_{ox} + \omega_{oy} - 2\Omega_z \sin \Delta\varphi_{xy}$ is seen for the system as summed at summing junction 318.

Figure 16A:
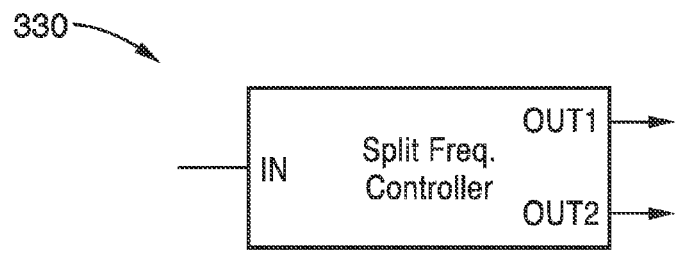
FIG. 16A and FIG. 16B are a split-frequency controller symbol and block diagram utilized according to at least one embodiment of the present invention.
Figure 16B:
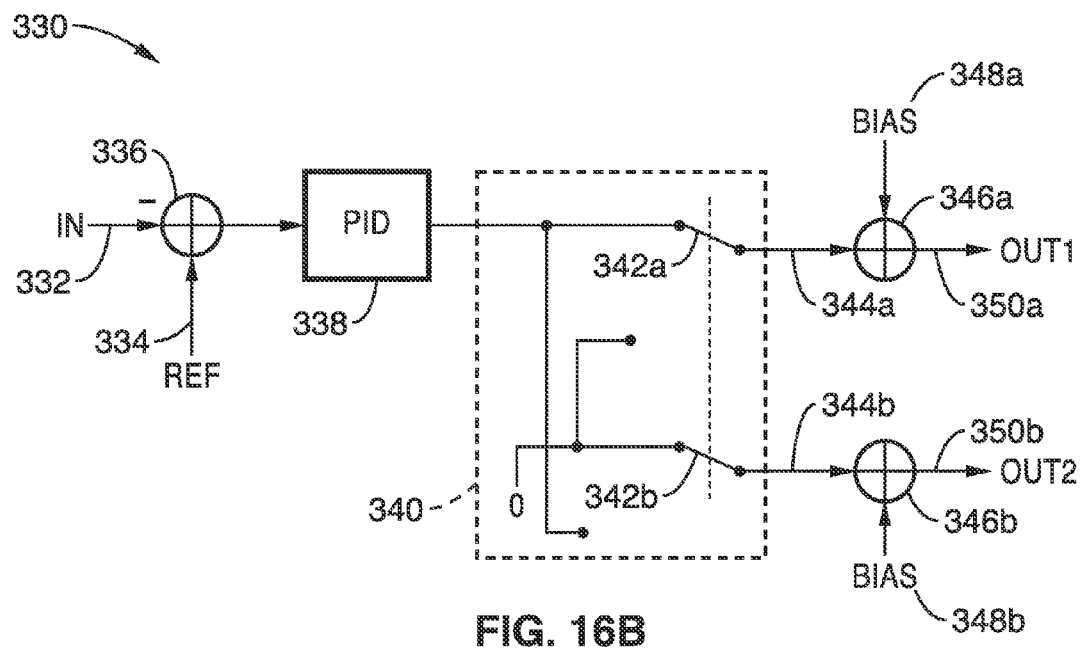

FIG. 16A is a symbol for a split frequency controller 330, one example embodiment of which is shown in FIG. 16B. An input frequency 332 is received at sum junction 336 along with reference frequency 334. Sum junction 336 is configured in a differential mode with input difference frequency 332 subtracted from reference frequency 334 and output to a PID controller 338. The PID controller 338 forces the input difference frequency equal to the reference frequency by controlling the x- and y-axis tuning electrodes of gyroscope transducer resonator 10, as seen in FIG. 15, which connects to OUT1 350a, and OUT2 350b, respectively. The switch block 340, with switches 342a, 342b select which tuning electrode that PID 338 controls, and outputs signals 344a, 344b to summing junctions 346a, 346b, which also receive bias signals 348a, 348b, to output OUT1 350a, and OUT2 350b. If the split frequency needs to be increased, the system connects the PID to the axis with the lower frequency, and if it needs to be decreased, the system connects the PID to the axis with the higher frequency.

The proof mass bias 346a, 346b, is added to the control signal to linearize the system. Many variations on this approach are possible. The split frequencies can be adjusted for example by equal and opposite amounts. Alternatively, each oscillation frequency can be controlled individually to match external references. In any case, the closed loop bandwidth of the control loop is preferably limited to be significantly smaller than the split frequency so that adjustments of the oscillation frequencies do not inadvertently cancel the rate signal or disturb the gyroscope's scale factor.

FIG. 17A is a symbol for an LFM demodulator 370, with an example embodiment of it shown in FIG. 17B. It should be appreciated that the output 320 from FIG. 15 must be further AM demodulated to recover the original rate signal. It will be recognized that LFM demodulator 370 is part of the output circuitry and requires oscillation signals 56 and 60 from FIG. 15.

FIG. 17B shows a possible embodiment of this final AM demodulation. A pair of axis oscillation signals $x_a \cos \varphi_x$ 372, $y_a \cos \varphi_x$ 374 which are fed into respective band-pass limiters 376, 378 to remove amplitude information. The resulting axis oscillation signals without amplitude information ($\cos \varphi_x$ and $\cos \varphi_x$) are then multiplied at multiplier 380, then multiplied 382 by a constant, seen here as 2, and passed through a low-pass filter 384, resulting in a signal $\cos \Delta \varphi_{xy}$ equal to the cosine of the phase difference between the inputs. Low-pass filter 384 removes the image at the sum of the input frequencies created by the multiplication. The low pass filtered signal is phase shifted by 90 degrees at a phase shifter 386, to construct the rate reference $\sin \Delta \varphi_{xy}$. The system used for constructing the rate reference is referred to as the rate reference detector.

The rate reference is multiplied at multiplier 388 by the output of the transducer 390 $\omega_{ox} + \omega_{oy} - 2\Omega_z \sin \Delta \varphi_{xy}$, (seen in FIG. 15 as system output 320) and the result is filtered at low-pass filter 392 to produce a final output 394 $\Omega_z$. The low-pass filter removes the image at twice the split frequency created by the multiplication. The system used producing the angular rate from the oscillation frequency and rate reference is referred to as the rate demodulator.

The rate reference detector and rate demodulator systems can be readily implemented in the digital domain, with the input signals 372, 374 first digitized by an analog-to-digital converter (ADC). It should be appreciated that signal 390 is already in the digital domain in at least one embodiment of the invention which utilizes programming executing on a computer and associated memory.

Similar to the rate reference detector and rate demodulator, the LFM output circuitry may also comprise a quadrature reference detector and quadrature demodulator. The quadrature reference detector produces the quadrature reference, which is the cosine of the phase difference between the displacement vibrations. The quadrature demodulator produces the amplitude component of the demodulated frequency 390 that is in phase with the quadrature reference. One possible embodiment includes an additional multiplier and low-pass filter. The frequency 390 is multiplied by the signal at the output of 384 and low-pass filtered to form an estimate of the quadrature, or cross-spring coupling.

The LFM output circuitry may also comprise a quadrature cancellation unit. The quadrature cancellation unit receives the quadrature estimate from the quadrature demodulator and applies electrostatic feedback through the actuating means in order to cancel the effect of mechanical quadrature. An embodiment of the quadrature cancellation unit comprises two variable gain amplifiers (VGAs) a PID controller. The first VGA input is connected to the first vibration mode through sensing means and the output is connected to the second vibration mode through actuating means. The second VGA input is connected to the second vibration mode through sensing means and the output is connected to the first vibration mode through actuating means. The VGAs nominally have the same gain, with the gain controlled by the PID controller. The PID controller adjusts the gain of the VGAs in order to drive the quadrature estimate to zero.

Many variations are possible when implementing the present invention based on the teachings presented herein, and on reconstructing the rate reference and quadrature reference from the oscillation signals. For example, the oscillation signals 372, 374 of FIG. 17B could first be converted to square waves, and a logic circuit could be used to produce a synchronization pulse when the relationship between the two clocks changes from leading to lagging. A reference sine wave generator could then be phase-locked to said reference pulse, effectively reconstructing the demodulator reference $\sin \Delta \varphi_{xy}$. One of ordinary skill in the art will appreciate that additional variations can be readily implemented without departing from the teachings of the invention.

1.7.2 Alternative Implementation of LFM Gyroscope.

An alternative implementation of the LFM gyroscope uses a variation of the QFM gyroscope system of FIG. 8 to achieve LFM mode operation. Instead of controlling the phase shift between the oscillations to a constant +90 or −90 degrees which results in QFM mode of operation, in the alternative LFM gyroscope, the phase controller 66 periodically switches the phase relationship between +90 and −90 degrees. This is accomplished, for example, by periodically switching the sign of the PID controller gain 140 from +1 to −1. The phase controller adjusts the voltage on tuning electrodes to create phase shift between the oscillations. The result of the periodic switching is a periodic reversal in the direction of the circular orbit. This periodically changes the sign of the rate sensitivity.

An external reference clock is used to set the rate of the periodic direction switching. This reference clock is also the rate reference, and a rate reference detector is unnecessary. The rate demodulator described for the LFM gyroscope is used to detect the amplitude component of the measured frequency 76 which is in-phase with the rate reference (reference clock).

A more general realization uses phase controller 66 to impose arbitrary phase relationships. For example, the controller could impose a pseudo-random phase relationship. This alternative would eliminate sensitivity to drift errors at the switching frequency.

1.7.3 Three Axis LFM Gyroscope.

Figure 18:
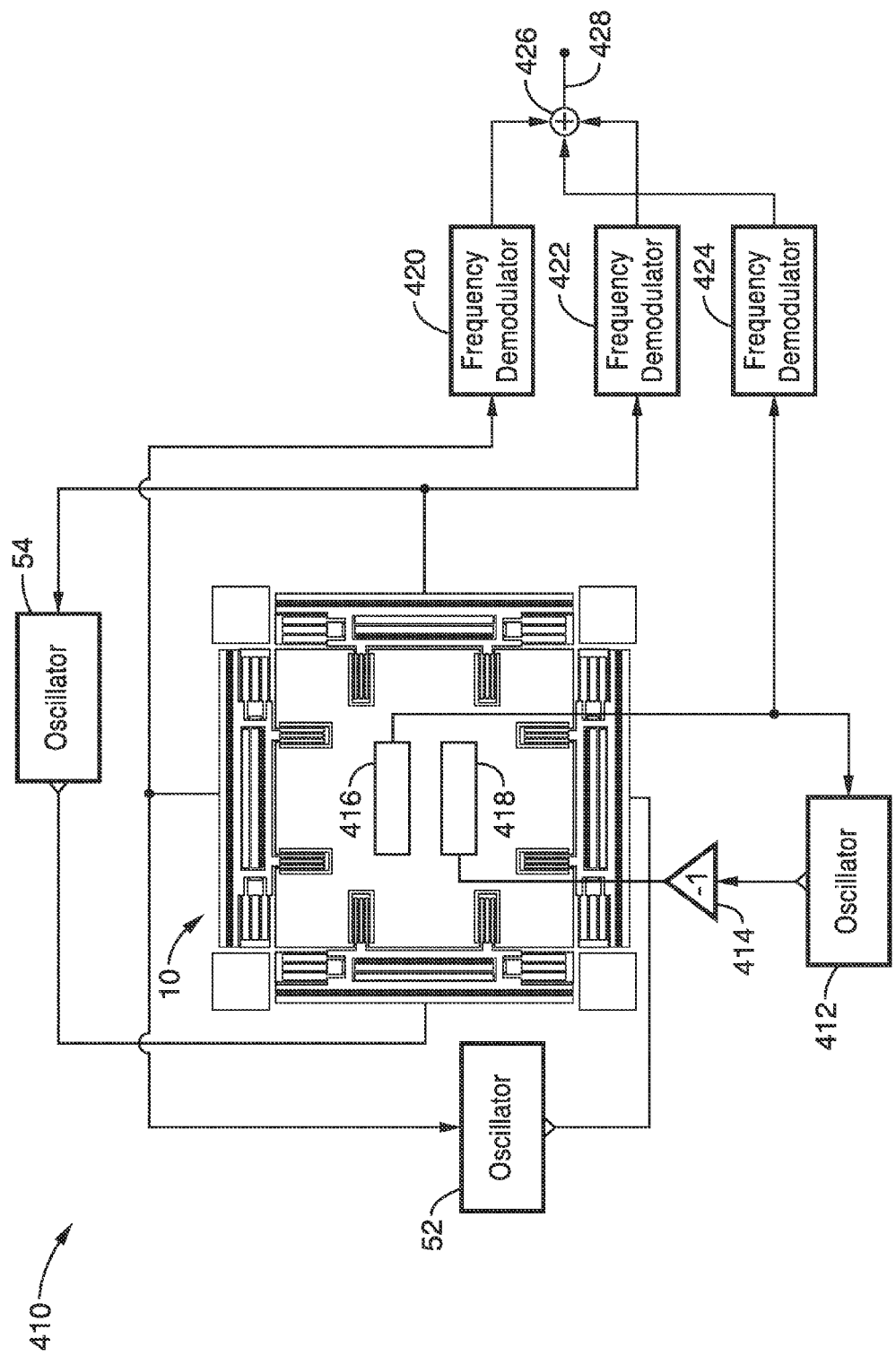
FIG. 18 is a block diagram of a 3-axis single proof-mass LFM gyroscope according to an embodiment of the present invention.

FIG. 18 illustrates an example 3-axis gyroscope embodiment 410 using a transducer 10 with single proof mass 12. Oscillators 52, 54 are shown as seen in previous embodiments, but with a third oscillator 412 utilized to sustain oscillation on the z-axis. It should be noted that oscillator 412 can have an identical implementation of oscillators 52, 54. The transducer structure is further configured with a means for generating and sensing a third axis of motion to the proof mass. By way of example and not limitation, parallel plates 416 and 418 are added in a plane above the proof mass (out of plane) in order to sense and actuate the proof mass in the z-direction. Because both plates are on the same side of the proof mass in this particular example embodiment, an inversion 414 is necessary in the oscillator loop. Two frequency demodulators were seen in previous embodiments, and are seen here 420, 422 along with a third frequency demodulator 424 to measure the z-axis frequency. It will be noted that third frequency demodulator 424 can be configured with the same structure as demodulators 420, 422. Outputs from demodulators 420, 422, 424 are summed 426 to sum all of the frequencies in generating an output 428 as:

$\omega_{ox}+\omega_{oy}+\omega_{oz}-2\alpha_z\Omega_z \sin \Delta\varphi_{xy}-2\alpha_y\Omega_y \sin \Delta\varphi_{xz}-2\alpha_x\Omega_x \sin \Delta\varphi_{yz}$.

Similar to the embodiment shown in FIG. 15, split frequency controllers can be added to control each split frequency. For example, three split frequency controllers are required to control the 3 split frequencies through 3 sets of tuning electrodes. The z-axis tuning electrode is implemented with a 3rd parallel plate similar to 416, 418. Another embodiment can be implemented by setting the natural frequencies to three independent references, with the frequency controller closed loop bandwidth set to a value much less than the split frequency to avoid signal cancellation.

Figure 19:
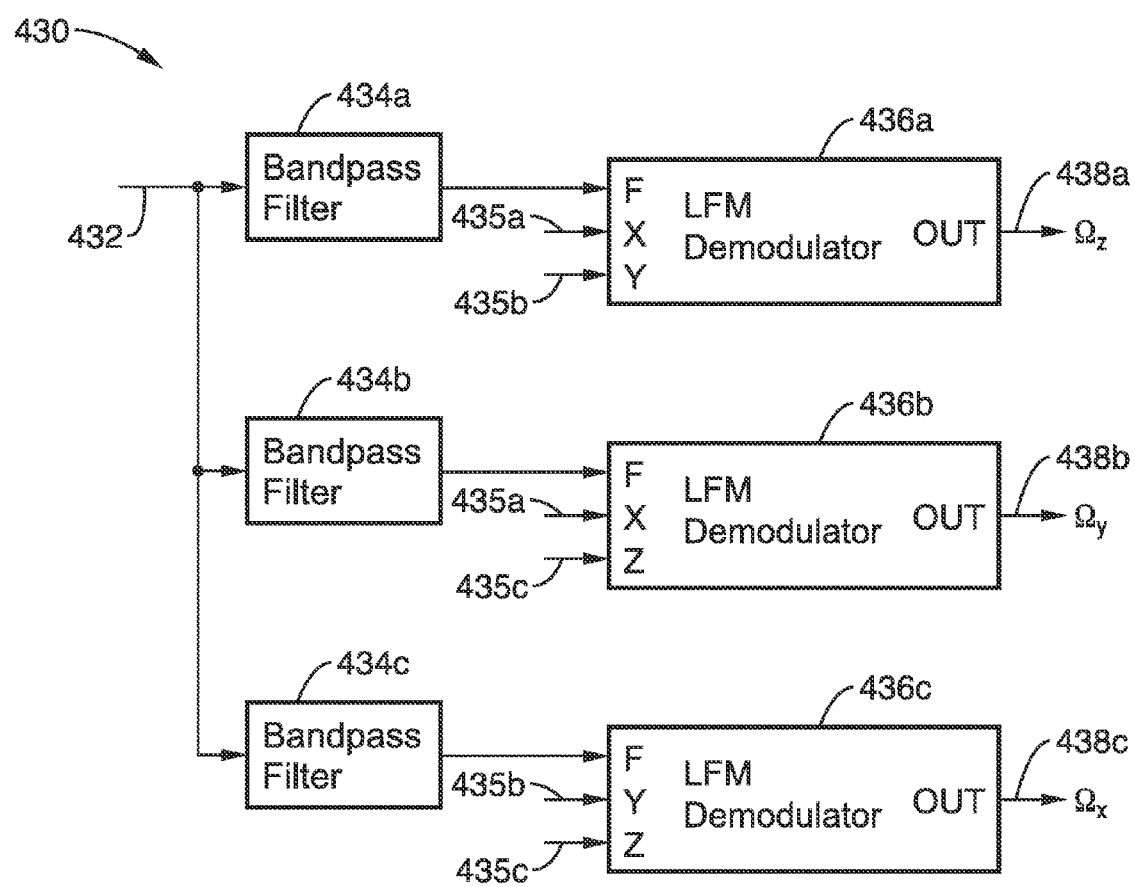
FIG. 19 is a block diagram of a readout system for demodulating rates from a 3-axis LFM gyroscope according to an embodiment of the present invention.

FIG. 19 illustrates an example embodiment 430 of final AM demodulation of the 3-axis LFM gyroscope seen in FIG. 18. An input 432 is received, such as from FIG. 18 output 428. The signal is band-pass filtered by three separate filters 434*a*, 434*b*, 434*c*, which select the frequency band with the desired rate signal and reject the others. For example, filter 434*a* is designed with a pass-band centered around frequency $\omega_{ox}-\omega_{oy}$, and a bandwidth sufficiently narrow to provide adequate rejection of the components $\omega_{ox}-\omega_{oz}$ and $\omega_{oy}-\omega_{oz}$. It should be noted that the system can be operated without the use of these band-pass filters, however, it would exhibit increased sensitivity to signal aliasing issues.

In FIG. 19, LFM demodulators 436*a*, 436*b*, 436*c* perform the final AM demodulation and in at least one embodiment are implemented identically to demodulator 370 in FIG. 17B. Demodulator 436*a* requires the x-axis 435*a* and y-axis 435*b* signals to produce the z-axis rate $\Omega_z$. Similarly, demodulator 436*b* requires the x-axis 435*a* and z-axis 435*c* signals to produce the y-axis rate $\Omega_y$. In like manner, demodulator 436*c* requires the y-axis 435*b* and z-axis 435*c* signals to produce the x-axis rate $\Omega_x$.

It should be appreciated that the system presented by FIG. 19 is perhaps most readily implemented in the digital domain, with the signals x, y and z axis signals first digitized by an ADC, and then processed by programming executing on a computer with associated memory. Many alternative implementations are possible and would be obvious to one of ordinary skill in the art of demodulating AM signals.

1.8 Combination of QFM and LFM Operating Modes.

From Table 1 it is apparent that the characteristics of the QFM and LFM operating modes are complementary. In particular, the QFM achieves very high signal bandwidth but has an offset that depends on frequency $\omega_c$. Small variations of $\omega_c$ for example due to temperature changes can result in a large rate measurement error. Conversely, the LFM is capable of achieving very low offset but its bandwidth is restricted by the frequency split $\Delta\omega_o$.

Figure 20:
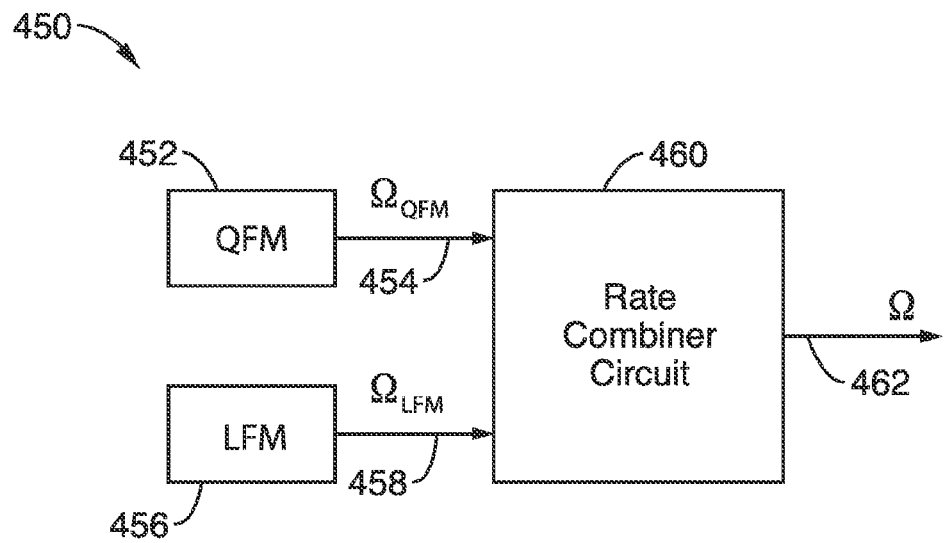
FIG. 20 is a block diagram of a gyroscope which combines QFM and LFM gyroscope outputs to provide high precision rate measurement according to an embodiment of the present invention.

FIG. 20 illustrates an example gyroscope embodiment 450 combining the benefits of QFM and LFM operating modes to simultaneously achieve high rate measurement bandwidth and low offset. The system consists of two separate gyroscopes 452, 456 which operate in QFM and LFM modes, respectively, producing rate measurement estimates $\Omega_{QFM}$ 454 and $\Omega_{LFM}$ 458. These measurements are received at a rate combiner circuit 460 producing a rate measurement output $\Omega$ 462 that has higher precision than the outputs from either the QFM or LFM gyroscopes alone.

Figure 21:
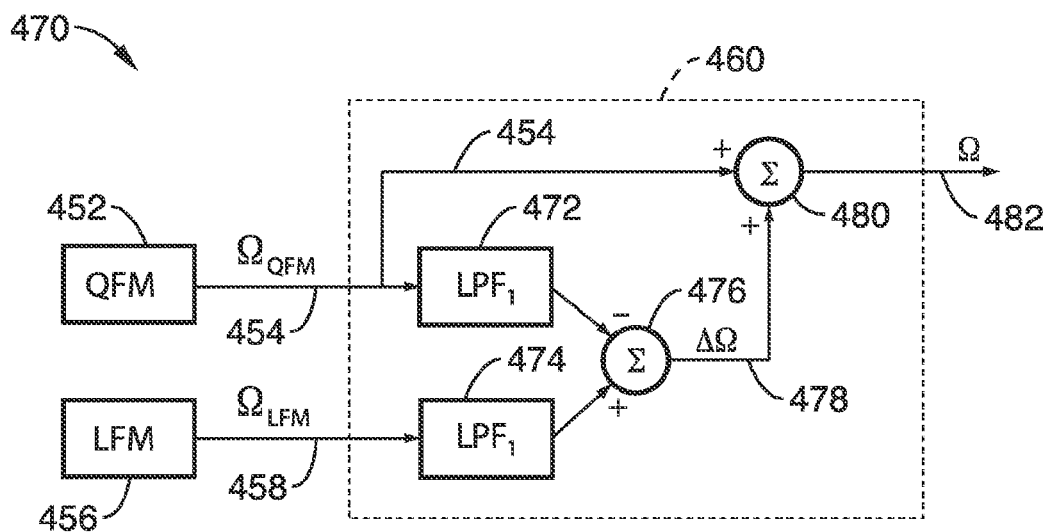
FIG. 21 is a block diagram of a circuit for combining QFM and LFM gyroscopes according to an embodiment of the present invention.

FIG. 21 illustrates an example embodiment 470 of a combined QFM-LFM gyroscope depicting one possible realization of the rate combiner circuit 460. As in the previous figure, a QFM gyroscope 452 and LFM gyroscope 456 output rate measurement estimates $\Omega_{QFM}$ 454 and $\Omega_{LFM}$ 458 received by rate combiner circuit 460. In the rate combiner 460, rate estimates $\Omega_{QFM}$ and $\Omega_{LFM}$ are passed through narrow bandwidth low-pass filters LPF$_1$ 472 and LPF$_2$ 474. The cutoff frequency of the low-pass filters is typically less than 1 Hz, but in practice is optimized for particular applications. A difference signal 478, representing offset error $\Delta\Omega$, is generated from summing circuit 476. This difference $\Delta\Omega$ is summed 480 with signal 454 from the output of the QFM gyroscope 452 to generate final rate measurement $\Omega$ 482.

From the discussion above it will be appreciated that the invention can be embodied in various ways, including the following:

1. An electromechanical system, comprising: a mechanical resonator having a first mode of vibration and an associated first natural frequency, and a second mode of vibration having an associated second natural frequency, wherein angular rate of motion input couples energy between said first mode of vibration and said second mode of vibration; sensors and actuators for each of the first mode and the second mode for transduction of an electrical signal into a mechanical vibration and transduction of a mechanical vibration into an electrical signal; sustaining circuitry connected to the sensors and actuators to maintain substantially constant, non-zero velocity amplitude vibrations in the first mode at a first oscillation frequency and the second mode at a second oscillation frequency; and output circuitry to infer an angular rate of motion from mechanical velocity or displacement of said first mode or said second mode, or both said first mode and said second mode.

2. The electromechanical system of any of the previous embodiments, wherein the substantially constant, non-zero velocity amplitude vibrations are substantially equal velocity, or displacement amplitude, or both velocity and displacement amplitude.

3. The electromechanical system of any of the previous embodiments, wherein the sustaining circuitry maintains one of a substantially +90 degrees and −90 degree phase difference between the displacement of the first mode of vibration and the displacement of the second mode of vibration.

4. The electromechanical system of any of the previous embodiments, further comprising a tuner to transduce electrical signals into a change in natural frequency of the first mode and the second mode.

5. The electromechanical system of any of the previous embodiments, further comprising phase and frequency control circuitry coupled with the mechanical resonator, the tuner and at least one sensor.

6. The electromechanical system of any of the previous embodiments, wherein said phase and frequency control circuitry comprises a frequency difference detector connected to at least one sensor and a split frequency controller connected to the tuner, wherein said split frequency controller adjusts natural frequency of at least one of the first mode and the second mode so that the frequency difference between the first mode and the second mode corresponds to a reference value.

7. The electromechanical system of any of the previous embodiments, wherein said phase and frequency control circuitry comprises a phase difference detector connected to at least one of said sensors and a phase controller connected to the tuner, wherein said phase controller adjusts natural frequency of at least one of the first mode and the second mode to control the phase difference between the first mode and the second mode to be substantially equal to a phase reference.

8. The electromechanical system of any of the previous embodiments, wherein said phase reference is selected from a constant +90° and a constant −90°.

9. The electromechanical system of any of the previous embodiments, wherein said phase reference is a signal periodically alternating between +90° and −90°.

10. The electromechanical system of any of the previous embodiments, wherein said output circuitry comprises at least one frequency demodulator receiving a frequency modulated signal from at least one of said sensors, and generating a signal representative of the input frequency.

11. The electromechanical system of any of the previous embodiments, wherein the angular rate of motion is extracted from said demodulated output.

12. The electromechanical system of any of the previous embodiments, wherein said output circuitry further comprises a rate reference detector which generates a rate reference having a constant-envelope signal of known amplitude, in-phase with the sine of phase difference between two displacement vibrations associated with the first mode and the second mode.

13. The electromechanical system of any of the previous embodiments, wherein said output circuitry further comprises at least one rate demodulator connected to a frequency measurement unit and an output of said rate reference detector, wherein the output of at least one said rate demodulator includes an amplitude component of measured frequency in-phase with the rate reference.

14. The electromechanical system of any of the previous embodiments, wherein said output circuitry further comprises a quadrature reference detector generating a quadrature reference with a constant-envelope signal of known amplitude, in-phase with cosine of phase difference between two displacement vibrations associated with the first mode and the second mode.

15. The electromechanical system of any of the previous embodiments, wherein said output circuitry further comprises at least one quadrature demodulator connected to a frequency measurement unit and an output of the quadrature reference detector, wherein the output of said the at least one quadrature demodulator is a measured frequency in-phase with the quadrature reference.

16. The electromechanical system of any of the previous embodiments, wherein said output circuitry further comprises a quadrature cancellation unit coupled to said mechanical resonator through an actuator and the output of said at least one quadrature demodulator.

17. The electromechanical system of any of the previous embodiments, wherein said quadrature cancellation unit further comprises a feedback controller configured for adjusting actuating signals applied to the first mode and the second mode to drive the output of said quadrature demodulator to zero.

18. The electromechanical system of any of the previous embodiments, wherein said mechanical resonator is configured with a third mode of vibration having a third natural frequency, wherein energy from the first mode, the second mode and the third mode is coupled to one another.

19. The electromechanical system of any of the previous embodiments, wherein said sustaining circuitry maintains continuous, substantially constant-envelope, non-zero displacement amplitude vibrations of the first mode, the second mode, and the third mode.

20. The electromechanical system of any of the previous embodiments, further comprising: a second mechanical resonator having a third mode of vibration and an associated third natural frequency, and a fourth mode of vibration having an associated fourth natural frequency, wherein energy from the third mode is coupled to energy from the fourth mode; further comprising additional sensors and additional actuator for each of the third mode and the fourth mode for transduction of an electrical signal into a mechanical vibration and transduction of a mechanical vibration into an electrical signal; further comprising additional sustaining circuitry for each of the third mode and the fourth mode connected to the additional sensors and additional actuators to maintain substantially continuous, non-zero velocity amplitude vibrations of the third mode at a third oscillation frequency and the fourth mode at a fourth oscillation frequency; and further comprising additional output circuitry to determine angular rate of motion from mechanical velocity or displacement of said third mode or said fourth mode, or both said third mode and said fourth mode.

21. The electromechanical system of any of the previous embodiments, wherein said first mode, second mode, third mode and said fourth mode have equal velocities.

22. The electromechanical system of any of the previous embodiments, further comprising an additional tuner for transduction of electrical signals into a change in natural frequency of the first mode, the second mode, the third mode, and the fourth mode.

23. The electromechanical system of any of the previous embodiments, further comprising phase and frequency control circuitry coupled with at least one mechanical resonator, the additional tuner and at least one sensor.

24. The electromechanical system of any of the previous embodiments, wherein said phase and frequency control circuitry comprises a phase difference detector connected to sensing means of the first resonator and a negative feedback controller connected to a tuning means of the first resonator, wherein said negative feedback controller adjusts one or more natural frequencies of one or both modes in order to control phase difference between said first and second oscillations with respect to a first phase reference.

25. The electromechanical system of any of the previous embodiments: wherein said phase and frequency control circuitry further comprises a phase difference detector connected to a sensor of said second resonator, and a negative feedback controller connected to a tuning means of the second resonator; and wherein said negative feedback controller adjusts one or more natural frequencies of one or both modes in order to control the phase difference between the third and fourth oscillations with respect to a second phase reference.

26. The electromechanical system of any of the previous embodiments, wherein said first phase reference is +90° and the second phase reference is −90°.

27. The electromechanical system of any of the previous embodiments, wherein the output circuitry comprises at least two frequency measurement units, wherein the first measured frequency outputs of the first frequency measurement unit are representative of oscillation frequencies of the first and second modes of vibration, and the second measured frequency outputs of the second frequency measurement unit are representative of oscillation frequencies of the third and fourth modes of vibration.

28. The electromechanical system of any of the previous embodiments, wherein each frequency measurement unit is comprised of at least one frequency demodulator.

29. The electromechanical system of any of the previous embodiments, wherein the output circuitry further comprises a subtractor connected to outputs of said first frequency measurement unit and second frequency measurement unit to generate a subtractor output signal as a difference between said first and second measured frequencies.

30. The electromechanical system of any of the previous embodiments, wherein the output circuitry further comprises one or more phase demodulators, and wherein said output circuitry derives integrated angular rate from determining a phase difference between vibrations of said first mechanical resonator and said second mechanical resonator.

31. The electromechanical system of any of the previous embodiments, wherein the input to said frequency demodulator is sensitive to both rising and falling edges of the input signal.

32. The electromechanical system of any of the previous embodiments, wherein said frequency demodulator comprises a coarse timer clocked by a first clock, and a fine timer clocked by a second clock, the first clock frequency being lower than the second clock frequency.

33. An electromechanical system, comprising: a mechanical resonator having a first mode of vibration and an associated first natural frequency, and a second mode of vibration having an associated second natural frequency, wherein angular rate of motion input couples energy between said first mode of vibration and said second mode of vibration; sensors and actuators for each of the first mode and the second mode for transduction of an electrical signal into a mechanical vibration and transduction of a mechanical vibration into an electrical signal; sustaining circuitry connected to the sensors and actuators to maintain substantially constant, non-zero velocity amplitude vibrations in the first mode at a first oscillation frequency and the second mode at a second oscillation frequency; phase and frequency control circuitry coupled with the mechanical resonator and at least one sensor for controlling phase difference, frequency difference, or a combination of phase and frequency difference between said first mode and said second mode; and output circuitry to extract angular rate of motion from instantaneous frequencies, mechanical velocity, or displacement of said first mode or said second mode, or both said first mode and said second mode.

34. The electromechanical system of any of the previous embodiments, wherein said first and second modes of said mechanical resonator are intentionally unmatched to reject cross damping error, and wherein said angular rate of motion is determined from measuring instantaneous frequencies of said first mode and said second mode.

35. The electromechanical system of any of the previous embodiments, wherein angular rate is determined from said instantaneous frequencies in response to performing frequency demodulation followed by amplitude demodulation.

36. The electromechanical system of any of the previous embodiments, further comprising a tuner to transduce electrical signals into a change in natural frequency of the first mode and the second mode.

37. The electromechanical system of any of the previous embodiments, further comprising phase and frequency control circuitry coupled with the mechanical resonator, the tuner and at least one sensor.

38. The electromechanical system of any of the previous embodiments, wherein said phase and frequency control circuitry comprises a phase difference detector connected to at least one of said sensors and a phase controller connected to the tuner, wherein said phase controller adjusts natural frequency of at least one of the first mode and the second mode to control the phase difference between the first mode and the second mode to be substantially equal to a phase reference.

39. The electromechanical system of any of the previous embodiments, wherein said phase and frequency control circuitry comprises a frequency difference detector connected to at least one sensor and a split frequency controller connected to the tuner, wherein said split frequency controller adjusts natural frequency of at least one of the first mode and the second mode so that the frequency difference between the first mode and the second mode corresponds to a reference value.

40. The electromechanical system of any of the previous embodiments, wherein the angular rate of motion is determined in response to measuring oscillation frequency of one or more vibration modes.

41. The electromechanical system of any of the previous embodiments, wherein said output circuitry comprises at least one frequency demodulator receiving a frequency modulated signal from at least one of said sensors, and performing sigma-delta modulation from which a demodulated output is generated.

42. The electromechanical system of any of the previous embodiments, wherein said output circuitry further comprises a rate reference detector which generates a rate reference having a constant-envelope signal of known amplitude, in-phase with the sine of phase difference between two displacement vibrations associated with the first mode and the second mode.

43. The electromechanical system of any of the previous embodiments, wherein said output circuitry further comprises at least one rate demodulator connected to a frequency measurement unit and an output of said rate reference detector, wherein the output of at least one said rate demodulator includes a measured frequency in-phase with the rate reference.

44. The electromechanical system of any of the previous embodiments, wherein said output circuitry further comprises a quadrature reference detector generating a quadrature reference with a constant-envelope signal of known amplitude, in-phase with cosine of phase difference between two displacement vibrations associated with the first mode and the second mode.

45. The electromechanical system of any of the previous embodiments, wherein said output circuitry further comprises at least one quadrature demodulator connected to a frequency measurement unit and an output of the quadrature reference detector, wherein the output of said the at least one quadrature demodulator is a measured frequency in-phase with the quadrature reference.

46. The electromechanical system of any of the previous embodiments, wherein said output circuitry further comprises a quadrature cancellation unit coupled to said mechanical resonator through an actuator and the output of said at least one quadrature demodulator.

47. The electromechanical system of any of the previous embodiments, wherein said quadrature cancellation unit further comprises a feedback controller configured for adjusting actuating signals applied to the first mode and the second mode to drive the output of said quadrature demodulator to zero.

48. The electromechanical system of any of the previous embodiments, further comprising: a second mechanical resonator having a third mode of vibration and an associated third natural frequency, and a fourth mode of vibration having an associated fourth natural frequency, wherein energy from the third mode is coupled to energy from the fourth mode; additional sensors and additional actuator for each of the third mode and the fourth mode for transduction of an electrical signal into a mechanical vibration and transduction of a mechanical vibration into an electrical signal; additional sustaining circuitry for each of the third mode and the fourth mode connected to the additional sensors and additional actuators to maintain substantially continuous, non-zero velocity amplitude vibrations of the third mode at a third oscillation frequency and the fourth mode at a fourth oscillation frequency; and additional output circuitry to determine angular rate of motion from instantaneous frequency, mechanical velocity, or displacement of said third mode or said fourth mode, or both said third mode and said fourth mode.

49. The electromechanical system of any of the previous embodiments, wherein said first mode, second mode, third mode and said fourth mode have equal velocities.

50. The electromechanical system of any of the previous embodiments, further comprising an additional tuner for transduction of electrical signals into a change in natural frequency of the first mode, the second mode, the third mode, and the fourth mode.

51. The electromechanical system of any of the previous embodiments, further comprising phase and frequency control circuitry coupled with at least one mechanical resonator, the additional tuner and at least one sensor.

52. The electromechanical system of any of the previous embodiments, wherein said phase and frequency control circuitry comprises a phase difference detector connected to sensing means of the first resonator and a negative feedback controller connected to a tuning means of the first resonator, wherein said negative feedback controller adjusts one or more natural frequencies of one or both modes in order to control phase difference between said first and second oscillations with respect to a first phase reference.

53. The electromechanical system of any of the previous embodiments: wherein said phase and frequency control circuitry further comprises a phase difference detector connected to a sensor of said second resonator, and a negative feedback controller connected to a tuning means of the second resonator; wherein said negative feedback controller adjusts one or more natural frequencies of one or both modes in order to control phase difference between the third and fourth oscillations with respect to a second phase reference.

54. The electromechanical system of any of the previous embodiments, wherein said first phase reference is +90° and the second phase reference is −90°.

55. The electromechanical system of any of the previous embodiments, wherein said output circuitry comprises at least two frequency measurement units, wherein the first measured frequency outputs of the first frequency measurement unit are responsive to oscillation frequencies of the first and second modes of vibration, and the second measured frequency outputs of the second frequency measurement unit are responsive to oscillation frequencies of the third and fourth modes of vibration.

56. The electromechanical system of any of the previous embodiments, wherein each frequency measurement unit is comprised of at least one frequency demodulator.

57. The electromechanical system of any of the previous embodiments, wherein the output circuitry further comprises a subtractor connected to outputs of said first frequency measurement unit and second frequency measurement unit to generate a subtractor output signal as a difference between said first and second measured frequencies.

58. The electromechanical system of any of the previous embodiments, wherein the output circuitry further comprises one or more phase demodulators, and wherein said output circuitry derives integrated angular rate from determining a phase difference between vibrations of said first mechanical resonator and said second mechanical resonator.

59. An electromechanical rate measurement system, comprising: a first gyroscope operating in a quadrature frequency modulated (QFM) gyroscope mode of operation; and a second gyroscope operating in a Lissajous Frequency Modulated (LFM) mode of operation; and a rate combiner circuit computing a rate measurement output from the combination of said first and second gyroscopes and which provides a higher precision than the rate measurement output provided by a single gyroscope operating in either a QFM or LFM mode.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Property Comparison Between Conventional and FM Gyroscope

|  | AM (Conventional) | | Inventive FM Gyroscope | |
| --- | --- | --- | --- | --- |
| Mode Matched | No | Yes | No (LFM) | Yes (QFM) |
| Bandwidth | $\Delta\omega_0$ | $\beta$ | $\Delta\omega_0$ | unrestricted |
| Scale Factor | $\dfrac{\alpha_z}{\Delta\omega_0}$ | $\dfrac{-\alpha_z \beta}{\beta^2 + \Delta\omega_0^2}$ | $-\dfrac{1}{2}\alpha_z\left(\dfrac{v_{ya}}{v_{xa}} + \dfrac{v_{xa}}{v_{ya}}\right)$ | $-\alpha_z\left(\dfrac{v_{ya}}{v_{xa}} + \dfrac{v_{xa}}{v_{ya}}\right)$ |
| Offset | $\dfrac{\beta_{xy}}{\alpha_z}$ | $\dfrac{\beta_{xy}}{\alpha_z}$ | $\dfrac{\beta_{xy}}{\alpha_z}\left(\dfrac{v_{ya}}{v_{xa}} - \dfrac{v_{xa}}{v_{ya}}\right)$ | $-\dfrac{\omega_c + \beta_{xy}}{\alpha_z}$ |

TABLE 1-continued

Property Comparison Between Conventional and FM Gyroscope

| | AM (Conventional) | | Inventive FM Gyroscope | |
|---|---|---|---|---|
| ARW* | $\frac{\Delta\omega_0}{\beta}$ | 1 | $\frac{\Delta\omega_0}{\beta}$ | 1 |

*ARW—ratio to mode matched

What is claimed is:

1. An electromechanical system, comprising:
    a mechanical resonator having a first mode of vibration and an associated first natural frequency, and a second mode of vibration having an associated second natural frequency, wherein angular rate of motion input couples energy between said first mode of vibration and said second mode of vibration;
    sensors and actuators for each of the first mode and the second mode for transduction of an electrical signal into a mechanical vibration and transduction of a mechanical vibration into an electrical signal;
    sustaining circuitry connected to the sensors and actuators to maintain substantially constant, non-zero velocity amplitude vibrations in the first mode at a first oscillation frequency and the second mode at a second oscillation frequency; and
    output circuitry to infer an angular rate of motion from mechanical velocity or displacement of said first mode or said second mode, or both said first mode and said second mode;
    a tuner to transduce electrical signals into a change in natural frequency of the first mode and the second mode;
    phase and frequency control circuitry coupled with the mechanical resonator, the tuner and at least one sensor; and
    wherein said phase and frequency control circuitry comprises a frequency difference detector connected to at least one sensor and a split frequency controller connected to the tuner, and wherein said split frequency controller adjusts natural frequency of at least one of the first mode and the second mode so that the frequency difference between the first mode and the second mode corresponds to a reference value.

2. The electromechanical system of claim 1, wherein the substantially constant, non-zero velocity amplitude vibrations are substantially equal velocity, or displacement amplitude, or both velocity and displacement amplitude.

3. The electromechanical system of claim 1, wherein the sustaining circuitry maintains one of a substantially +90 degrees and −90 degree phase difference between the displacement of the first mode of vibration and the displacement of the second mode of vibration.

4. The electromechanical system of claim 1, wherein said phase and frequency control circuitry comprises a phase difference detector connected to at least one of said sensors and a phase controller connected to the tuner, and wherein said phase controller adjusts natural frequency of at least one of the first mode and the second mode to control the phase difference between the first mode and the second mode to be substantially equal to a phase reference.

5. The electromechanical system of claim 4, wherein said phase reference is selected from a constant +90° and a constant −90°.

6. The electromechanical system of claim 1, wherein said output circuitry comprises at least one frequency demodulator receiving a frequency modulated signal from at least one of said sensors, and generating a demodulated output.

7. The electromechanical system of claim 6, wherein the angular rate of motion is estimated from said demodulated output.

8. The electromechanical system of claim 6, wherein said output circuitry further comprises a rate reference detector which generates a rate reference having a constant-envelope signal of known amplitude, in-phase with the sine of phase difference between two displacement vibrations associated with the first mode and the second mode.

9. The electromechanical system of claim 8, wherein said output circuitry further comprises at least one rate demodulator connected to a frequency measurement unit and an output of said rate reference detector, and wherein the output of at least one said rate demodulator is an amplitude component of measured frequency in-phase with the rate reference.

10. The electromechanical system of claim 1, further comprising:
    a second mechanical resonator having a third mode of vibration and an associated third natural frequency, and a fourth mode of vibration having an associated fourth natural frequency, wherein energy from the third mode is coupled to energy from the fourth mode;
    additional sensors and additional actuators for each of the third mode and the fourth mode for transduction of an electrical signal into a mechanical vibration and transduction of a mechanical vibration into an electrical signal;
    additional sustaining circuitry for each of the third mode and the fourth mode connected to the additional sensors and additional actuators to maintain substantially continuous, non-zero velocity amplitude vibrations of the third mode at a third oscillation frequency and the fourth mode at a fourth oscillation frequency; and
    additional output circuitry to determine angular rate of motion from mechanical velocity or displacement of said third mode or said fourth mode, or both said third mode and said fourth mode.

11. The electromechanical system of claim 10, wherein said first mode, second mode, third mode and said fourth mode have equal velocities.

12. The electromechanical system of claim 10, further comprising an additional tuner for transduction of electrical signals into a change in natural frequency of the first mode, the second mode, the third mode, and the fourth mode.

13. The electromechanical system of claim 12, further comprising phase and frequency control circuitry coupled with at least one mechanical resonator, the additional tuner and at least one sensor.

14. The electromechanical system of claim 13, wherein said phase and frequency control circuitry comprises a phase difference detector connected to sensing means of the first resonator and a negative feedback controller connected to a tuning means of the first resonator, wherein said negative feedback controller adjusts one or more natural frequencies of one or both modes in order to control phase difference between said first and second oscillations with respect to a first phase reference.

15. The electromechanical system of claim 14:
wherein said phase and frequency control circuitry further comprises a phase difference detector connected to a sensor of said second resonator, and a negative feedback controller connected to a tuning means of the second resonator; and
wherein said negative feedback controller adjusts one or more natural frequencies of one or both modes in order to control the phase difference between the third and fourth oscillations with respect to a second phase reference.

16. The electromechanical system of claim 15, wherein said first phase reference is +90° and the second phase reference is −90°.

17. The electromechanical system of claim 16, wherein the output circuitry comprises at least two frequency measurement units, wherein the first measured frequency outputs of the first frequency measurement unit are representative of oscillation frequencies of the first and second modes of vibration, and the second measured frequency outputs of the second frequency measurement unit are representative of oscillation frequencies of the third and fourth modes of vibration.

18. The electromechanical system of claim 17, wherein each frequency measurement unit is comprised of at least one frequency demodulator.

19. The electromechanical system of claim 17, wherein the output circuitry further comprises a subtractor connected to outputs of said first frequency measurement unit and second frequency measurement unit to generate a subtractor output signal as a difference between said first and second measured frequencies.

20. The electromechanical system of claim 17, wherein the output circuitry further comprises one or more phase demodulators, and wherein said output circuitry derives integrated angular rate from determining a phase difference between vibrations of said first mechanical resonator and said second mechanical resonator.

21. An electromechanical system, comprising:
a mechanical resonator having a non-zero average frequency difference between oscillations of said mechanical resonator in a first mode of vibration and a second mode of vibration, wherein angular rate of motion input couples energy between said first mode of vibration and said second mode of vibration;
sensors and actuators for each of the first mode and the second mode for transduction of an electrical signal into a mechanical vibration and transduction of a mechanical vibration into an electrical signal;
sustaining circuitry connected to the sensors and actuators to maintain substantially constant, non-zero velocity amplitude vibrations in the first mode at a first oscillation frequency and the second mode at a second oscillation frequency;
phase and frequency control circuitry coupled with the mechanical resonator and at least one sensor for controlling phase difference, frequency difference, or a combination of phase and frequency difference between said first mode and said second mode;
output circuitry to estimate angular rate of motion from instantaneous frequencies, mechanical velocity, or displacement of said first mode or said second mode, or both said first mode and said second mode;
a second mechanical resonator having a third mode of vibration and an associated third natural frequency, and a fourth mode of vibration having an associated fourth natural frequency, wherein energy from the third mode is coupled to energy from the fourth mode;
additional sensors and additional actuators for each of the third mode and the fourth mode for transduction of an electrical signal into a mechanical vibration and transduction of a mechanical vibration into an electrical signal;
additional sustaining circuitry for each of the third mode and the fourth mode connected to the additional sensors and additional actuators to maintain substantially continuous, non-zero velocity amplitude vibrations of the third mode at a third oscillation frequency and the fourth mode at a fourth oscillation frequency; and
additional output circuitry to determine angular rate of motion from instantaneous frequency, mechanical velocity or displacement of said third mode or said fourth mode, or both said third mode and said fourth mode;
wherein said first mode, second mode, third mode and said fourth mode have equal velocities.

22. The electromechanical system of claim 21, wherein said first and second modes of said mechanical resonator are intentionally unmatched to reject cross damping error, and wherein said angular rate of motion is determined from measuring instantaneous frequencies of said first mode and said second mode.

23. The electromechanical system of claim 21, wherein angular rate is determined from said instantaneous frequencies in response to performing frequency demodulation followed by amplitude demodulation.

24. The electromechanical system of claim 21, further comprising a tuner to transduce electrical signals into a change in natural frequency of the first mode and the second mode.

25. The electromechanical system of claim 24, further comprising phase and frequency control circuitry coupled with the mechanical resonator, the tuner and at least one sensor.

26. The electromechanical system of claim 25, wherein said phase and frequency control circuitry comprises a phase difference detector connected to at least one of said sensors and a phase controller connected to the tuner, wherein said phase controller adjusts natural frequency of at least one of the first mode and the second mode to control the phase difference between the first mode and the second mode to be substantially equal to a phase reference.

27. The electromechanical system of claim 26, wherein said phase and frequency control circuitry comprises a frequency difference detector connected to at least one sensor and a split frequency controller connected to the tuner, wherein said split frequency controller adjusts natural frequency of at least one of the first mode and the second mode so that the frequency difference between the first mode and the second mode corresponds to a reference value.

28. The electromechanical system of claim 21, wherein the angular rate of motion is determined in response to measuring oscillation frequency of one or more vibration modes.

29. The electromechanical system of claim 21, wherein said output circuitry comprises at least one frequency demodulator receiving a frequency modulated signal from at least one of said sensors, and generating a demodulated output.

30. The electromechanical system of claim 29, wherein said output circuitry further comprises a rate reference detector which generates a rate reference having a constant-envelope signal of known amplitude, in-phase with the sine of phase difference between two displacement vibrations associated with the first mode and the second mode.

31. The electromechanical system of claim 30, wherein said output circuitry further comprises at least one rate demodulator connected to a frequency measurement unit and an output of said rate reference detector, wherein the output of at least one said rate demodulator is an amplitude component of measured frequency in-phase with the rate reference.

32. The electromechanical system of claim 21, further comprising an additional tuner for transduction of electrical signals into a change in natural frequency of the first mode, the second mode, the third mode, and the fourth mode.

33. The electromechanical system of claim 32, further comprising phase and frequency control circuitry coupled with at least one mechanical resonator, the additional tuner and at least one sensor.

34. The electromechanical system of claim 33, wherein said phase and frequency control circuitry comprises a phase difference detector connected to sensing means of the first resonator and a negative feedback controller connected to a tuning means of the first resonator, wherein said negative feedback controller adjusts one or more natural frequencies of one or both modes in order to control phase difference between said first and second oscillations with respect to a first phase reference.

35. The electromechanical system of claim 34:
wherein said phase and frequency control circuitry further comprises a phase difference detector connected to a sensor of said second resonator, and a negative feedback controller connected to a tuning means of the second resonator; and
wherein said negative feedback controller adjusts one or more natural frequencies of one or both modes in order to control phase difference between the third and fourth oscillations with respect to a second phase reference.

36. The electromechanical system of claim 35, wherein said first phase reference is +90° and the second phase reference is −90°.

37. The electromechanical system of claim 21, wherein the output circuitry comprises at least two frequency measurement units, wherein the first measured frequency outputs of the first frequency measurement unit are responsive to oscillation frequencies of the first and second modes of vibration, and the second measured frequency outputs of the second frequency measurement unit are responsive to oscillation frequencies of the third and fourth modes of vibration.

38. The electromechanical system of claim 37, wherein each frequency measurement unit is comprised of at least one frequency demodulator.

39. The electromechanical system of claim 38, wherein the output circuitry further comprises a subtractor connected to outputs of said first frequency measurement unit and second frequency measurement unit to generate a subtractor output signal as a difference between said first and second measured frequencies.

40. The electromechanical system of claim 21, wherein said output circuitry further comprises one or more phase demodulators, and wherein said output circuitry derives integrated angular rate from determining a phase difference between vibrations of said first mechanical resonator and said second mechanical resonator.

41. An electromechanical system, comprising:
a mechanical resonator having a first mode of vibration and an associated first natural frequency, and a second mode of vibration having an associated second natural frequency, wherein angular rate of motion input couples energy between said first mode of vibration and said second mode of vibration;
sensors and actuators for each of the first mode and the second mode for transduction of an electrical signal into a mechanical vibration and transduction of a mechanical vibration into an electrical signal;
sustaining circuitry connected to the sensors and actuators to maintain substantially constant, non-zero velocity amplitude vibrations in the first mode at a first oscillation frequency and the second mode at a second oscillation frequency;
output circuitry to infer an angular rate of motion from mechanical velocity or displacement of said first mode or said second mode, or both said first mode and said second mode;
wherein said output circuitry comprises at least one frequency demodulator receiving a frequency modulated signal from at least one of said sensors, and generating a demodulated output; and
wherein said output circuitry further comprises a rate reference detector which generates a rate reference having a constant-envelope signal of known amplitude, in-phase with the sine of phase difference between two displacement vibrations associated with the first mode and the second mode.

42. The electromechanical system of claim 41, wherein the substantially constant, non-zero velocity amplitude vibrations are substantially equal velocity, or displacement amplitude, or both velocity and displacement amplitude.

43. The electromechanical system of claim 41, wherein the sustaining circuitry maintains one of a substantially +90 degrees and −90 degree phase difference between the displacement of the first mode of vibration and the displacement of the second mode of vibration.

44. The electromechanical system of claim 41, further comprising a tuner to transduce electrical signals into a change in natural frequency of the first mode and the second mode.

45. The electromechanical system of claim 44, further comprising phase and frequency control circuitry coupled with the mechanical resonator, the tuner and at least one sensor.

46. The electromechanical system of claim 45, wherein said phase and frequency control circuitry comprises a frequency difference detector connected to at least one sensor and a split frequency controller connected to the tuner, and wherein said split frequency controller adjusts natural frequency of at least one of the first mode and the second mode so that the frequency difference between the first mode and the second mode corresponds to a reference value.

47. The electromechanical system of claim 45, wherein said phase and frequency control circuitry comprises a phase difference detector connected to at least one of said sensors and a phase controller connected to the tuner, and wherein said phase controller adjusts natural frequency of at least one of the first mode and the second mode to control the phase difference between the first mode and the second mode to be substantially equal to a phase reference.

48. The electromechanical system of claim 47, wherein said phase reference is selected from a constant +90° and a constant −90°.

49. The electromechanical system of claim 41, wherein said output circuitry further comprises at least one rate demodulator connected to a frequency measurement unit and an output of said rate reference detector, and wherein the output of at least one said rate demodulator is an amplitude component of measured frequency in-phase with the rate reference.

50. The electromechanical system of claim 41, further comprising:
a second mechanical resonator having a third mode of vibration and an associated third natural frequency, and a fourth mode of vibration having an associated fourth natural frequency, wherein energy from the third mode is coupled to energy from the fourth mode;
additional sensors and additional actuators for each of the third mode and the fourth mode for transduction of an electrical signal into a mechanical vibration and transduction of a mechanical vibration into an electrical signal;
additional sustaining circuitry for each of the third mode and the fourth mode connected to the additional sensors and additional actuators to maintain substantially continuous, non-zero velocity amplitude vibrations of the third mode at a third oscillation frequency and the fourth mode at a fourth oscillation frequency; and
additional output circuitry to determine angular rate of motion from mechanical velocity or displacement of said third mode or said fourth mode, or both said third mode and said fourth mode.

51. The electromechanical system of claim 50, wherein said first mode, second mode, third mode and said fourth mode have equal velocities.

52. The electromechanical system of claim 50, further comprising an additional tuner for transduction of electrical signals into a change in natural frequency of the first mode, the second mode, the third mode, and the fourth mode.

53. The electromechanical system of claim 52, further comprising phase and frequency control circuitry coupled with at least one mechanical resonator, the additional tuner and at least one sensor.

54. The electromechanical system of claim 53, wherein said phase and frequency control circuitry comprises a phase difference detector connected to sensing means of the first resonator and a negative feedback controller connected to a tuning means of the first resonator, wherein said negative feedback controller adjusts one or more natural frequencies of one or both modes in order to control phase difference between said first and second oscillations with respect to a first phase reference.

55. The electromechanical system of claim 54:
wherein said phase and frequency control circuitry further comprises a phase difference detector connected to a sensor of said second resonator, and a negative feedback controller connected to a tuning means of the second resonator; and
wherein said negative feedback controller adjusts one or more natural frequencies of one or both modes in order to control the phase difference between the third and fourth oscillations with respect to a second phase reference.

56. The electromechanical system of claim 55, wherein said first phase reference is +90° and the second phase reference is −90°.

57. The electromechanical system of claim 56, wherein the output circuitry comprises at least two frequency measurement units, wherein the first measured frequency outputs of the first frequency measurement unit are representative of oscillation frequencies of the first and second modes of vibration, and the second measured frequency outputs of the second frequency measurement unit are representative of oscillation frequencies of the third and fourth modes of vibration.

58. The electromechanical system of claim 57, wherein each frequency measurement unit is comprised of at least one frequency demodulator.

59. The electromechanical system of claim 57, wherein the output circuitry further comprises a subtractor connected to outputs of said first frequency measurement unit and second frequency measurement unit to generate a subtractor output signal as a difference between said first and second measured frequencies.

60. The electromechanical system of claim 57, wherein the output circuitry further comprises one or more phase demodulators, and wherein said output circuitry derives integrated angular rate from determining a phase difference between vibrations of said first mechanical resonator and said second mechanical resonator.

61. An electromechanical system, comprising:
a mechanical resonator having a first mode of vibration and an associated first natural frequency, and a second mode of vibration having an associated second natural frequency, wherein angular rate of motion input couples energy between said first mode of vibration and said second mode of vibration;
sensors and actuators for each of the first mode and the second mode for transduction of an electrical signal into a mechanical vibration and transduction of a mechanical vibration into an electrical signal;
sustaining circuitry connected to the sensors and actuators to maintain substantially constant, non-zero velocity amplitude vibrations in the first mode at a first oscillation frequency and the second mode at a second oscillation frequency;
output circuitry to infer an angular rate of motion from mechanical velocity or displacement of said first mode or said second mode, or both said first mode and said second mode;
a second mechanical resonator having a third mode of vibration and an associated third natural frequency, and a fourth mode of vibration having an associated fourth natural frequency, wherein energy from the third mode is coupled to energy from the fourth mode;
additional sensors and additional actuators for each of the third mode and the fourth mode for transduction of an electrical signal into a mechanical vibration and transduction of a mechanical vibration into an electrical signal;
additional sustaining circuitry for each of the third mode and the fourth mode connected to the additional sensors and additional actuators to maintain substantially continuous, non-zero velocity amplitude vibrations of the third mode at a third oscillation frequency and the fourth mode at a fourth oscillation frequency;
additional output circuitry to determine angular rate of motion from mechanical velocity or displacement of said third mode or said fourth mode, or both said third mode and said fourth mode;
an additional tuner for transduction of electrical signals into a change in natural frequency of the first mode, the second mode, the third mode, and the fourth mode; and phase and frequency control circuitry coupled with at least one mechanical resonator, the additional tuner and at least one sensor;

wherein said phase and frequency control circuitry comprises a phase difference detector connected to sensing means of the first resonator and a negative feedback controller connected to a tuning means of the first resonator, wherein said negative feedback controller adjusts one or more natural frequencies of one or both modes in order to control phase difference between said first and second oscillations with respect to a first phase reference;

wherein said phase and frequency control circuitry further comprises a phase difference detector connected to a sensor of said second resonator, and a negative feedback controller connected to a tuning means of the second resonator;

wherein said negative feedback controller adjusts one or more natural frequencies of one or both modes in order to control the phase difference between the third and fourth oscillations with respect to a second phase reference;

wherein said first phase reference is +90° and the second phase reference is −90°;

wherein the output circuitry comprises at least two frequency measurement units, wherein the first measured frequency outputs of the first frequency measurement unit are representative of oscillation frequencies of the first and second modes of vibration, and the second measured frequency outputs of the second frequency measurement unit are representative of oscillation frequencies of the third and fourth modes of vibration; and wherein said output circuitry further comprises either (a) a subtractor connected to outputs of said first frequency measurement unit and second frequency measurement unit to generate a subtractor output signal as a difference between said first and second measured frequencies; or (b) one or more phase demodulators in which said output circuitry derives integrated angular rate from determining a phase difference between vibrations of said first mechanical resonator and said second mechanical resonator; or (c) a combination of (a) and (b) above.

62. An electromechanical system, comprising:
a mechanical resonator having a non-zero average frequency difference between oscillations of said mechanical resonator in a first mode of vibration and a second mode of vibration, wherein angular rate of motion input couples energy between said first mode of vibration and said second mode of vibration;
sensors and actuators for each of the first mode and the second mode for transduction of an electrical signal into a mechanical vibration and transduction of a mechanical vibration into an electrical signal;
sustaining circuitry connected to the sensors and actuators to maintain substantially constant, non-zero velocity amplitude vibrations in the first mode at a first oscillation frequency and the second mode at a second oscillation frequency;
phase and frequency control circuitry coupled with the mechanical resonator and at least one sensor for controlling phase difference, frequency difference, or a combination of phase and frequency difference between said first mode and said second mode;
output circuitry to estimate angular rate of motion from instantaneous frequencies, mechanical velocity, or displacement of said first mode or said second mode, or both said first mode and said second mode;
a second mechanical resonator having a third mode of vibration and an associated third natural frequency, and a fourth mode of vibration having an associated fourth natural frequency, wherein energy from the third mode is coupled to energy from the fourth mode;
additional sensors and additional actuators for each of the third mode and the fourth mode for transduction of an electrical signal into a mechanical vibration and transduction of a mechanical vibration into an electrical signal;
additional sustaining circuitry for each of the third mode and the fourth mode connected to the additional sensors and additional actuators to maintain substantially continuous, non-zero velocity amplitude vibrations of the third mode at a third oscillation frequency and the fourth mode at a fourth oscillation frequency; and
additional output circuitry to determine angular rate of motion from instantaneous frequency, mechanical velocity or displacement of said third mode or said fourth mode, or both said third mode and said fourth mode;
wherein the output circuitry comprises at least two frequency measurement units, wherein the first measured frequency outputs of the first frequency measurement unit are responsive to oscillation frequencies of the first and second modes of vibration, and the second measured frequency outputs of the second frequency measurement unit are responsive to oscillation frequencies of the third and fourth modes of vibration;
wherein each frequency measurement unit is comprised of at least one frequency demodulator; and
wherein the output circuitry further comprises a subtractor connected to outputs of said first frequency measurement unit and second frequency measurement unit to generate a subtractor output signal as a difference between said first and second measured frequencies.

63. An electromechanical system, comprising:
a second mechanical resonator having a third mode of vibration and an associated third natural frequency, and a fourth mode of vibration having an associated fourth natural frequency, wherein energy from the third mode is coupled to energy from the fourth mode;
additional sensors and additional actuators for each of the third mode and the fourth mode for transduction of an electrical signal into a mechanical vibration and transduction of a mechanical vibration into an electrical signal;
additional sustaining circuitry for each of the third mode and the fourth mode connected to the additional sensors and additional actuators to maintain substantially continuous, non-zero velocity amplitude vibrations of the third mode at a third oscillation frequency and the fourth mode at a fourth oscillation frequency;
additional output circuitry to determine angular rate of motion from instantaneous frequency, mechanical velocity or displacement of said third mode or said fourth mode, or both said third mode and said fourth mode;
a mechanical resonator having a non-zero average frequency difference between oscillations of said mechanical resonator in a first mode of vibration and a second mode of vibration, wherein angular rate of motion input couples energy between said first mode of vibration and said second mode of vibration;

sensors and actuators for each of the first mode and the second mode for transduction of an electrical signal into a mechanical vibration and transduction of a mechanical vibration into an electrical signal;

sustaining circuitry connected to the sensors and actuators to maintain substantially constant, non-zero velocity amplitude vibrations in the first mode at a first oscillation frequency and the second mode at a second oscillation frequency;

phase and frequency control circuitry coupled with the mechanical resonator and at least one sensor for controlling phase difference, frequency difference, or a combination of phase and frequency difference between said first mode and said second mode; and output circuitry to estimate angular rate of motion from instantaneous frequencies, mechanical velocity, or displacement of said first mode or said second mode, or both said first mode and said second mode;

wherein said output circuitry further comprises one or more phase demodulators, and wherein said output circuitry derives integrated angular rate from determining a phase difference between vibrations of said first mechanical resonator and said second mechanical resonator.

64. An electromechanical system, comprising:

a mechanical resonator having a non-zero average frequency difference between oscillations of said mechanical resonator in a first mode of vibration and a second mode of vibration, wherein angular rate of motion input couples energy between said first mode of vibration and said second mode of vibration;

sensors and actuators for each of the first mode and the second mode for transduction of an electrical signal into a mechanical vibration and transduction of a mechanical vibration into an electrical signal;

sustaining circuitry connected to the sensors and actuators to maintain substantially constant, non-zero velocity amplitude vibrations in the first mode at a first oscillation frequency and the second mode at a second oscillation frequency;

phase and frequency control circuitry coupled with the mechanical resonator and at least one sensor for controlling phase difference, frequency difference, or a combination of phase and frequency difference between said first mode and said second mode; and output circuitry to estimate angular rate of motion from instantaneous frequencies, mechanical velocity, or displacement of said first mode or said second mode, or both said first mode and said second mode;

wherein said output circuitry comprises at least one frequency demodulator receiving a frequency modulated signal from at least one of said sensors, and generating a demodulated output; and wherein said output circuitry further comprises a rate reference detector which generates a rate reference having a constant-envelope signal of known amplitude, in-phase with the sine of phase difference between two displacement vibrations associated with the first mode and the second mode.

65. The electromechanical system of claim 64, wherein said output circuitry further comprises at least one rate demodulator connected to a frequency measurement unit and an output of said rate reference detector, wherein the output of at least one said rate demodulator is an amplitude component of measured frequency in-phase with the rate reference.

66. An electromechanical system, comprising:

a mechanical resonator having a non-zero average frequency difference between oscillations of said mechanical resonator in a first mode of vibration and a second mode of vibration, wherein angular rate of motion input couples energy between said first mode of vibration and said second mode of vibration;

sensors and actuators for each of the first mode and the second mode for transduction of an electrical signal into a mechanical vibration and transduction of a mechanical vibration into an electrical signal;

sustaining circuitry connected to the sensors and actuators to maintain substantially constant, non-zero velocity amplitude vibrations in the first mode at a first oscillation frequency and the second mode at a second oscillation frequency;

phase and frequency control circuitry coupled with the mechanical resonator and at least one sensor for controlling phase difference, frequency difference, or a combination of phase and frequency difference between said first mode and said second mode;

output circuitry to estimate angular rate of motion from instantaneous frequencies, mechanical velocity, or displacement of said first mode or said second mode, or both said first mode and said second mode;

a tuner to transduce electrical signals into a change in natural frequency of the first mode and the second mode; and phase and frequency control circuitry coupled with the mechanical resonator, the tuner and at least one sensor;

wherein said phase and frequency control circuitry comprises a phase difference detector connected to at least one of said sensors and a phase controller connected to the tuner, wherein said phase controller adjusts natural frequency of at least one of the first mode and the second mode to control the phase difference between the first mode and the second mode to be substantially equal to a phase reference; and wherein said phase and frequency control circuitry further comprises a frequency difference detector connected to at least one sensor and a split frequency controller connected to the tuner, wherein said split frequency controller adjusts natural frequency of at least one of the first mode and the second mode so that the frequency difference between the first mode and the second mode corresponds to a reference value.

* * * * *